United States Patent
Poort et al.

(10) Patent No.: US 12,135,989 B2
(45) Date of Patent: Nov. 5, 2024

(54) COMPUTE RECOMMENDATION ENGINE

(71) Applicant: Rescale, Inc., San Francisco, CA (US)

(72) Inventors: Gregorius E. Poort, San Francisco, CA (US); Mulyanto W. Poort, San Francisco, CA (US); Ryan A. Kaneshiro, San Francisco, CA (US); Adam C. McKenzie, Walnut Creek, CA (US); Alexander D. Kudlick, San Francisco, CA (US); Mark G. Whitney, Berkeley, CA (US); Alexander P. Huang, Walnut, CA (US); Dongting Yu, San Francisco, CA (US); Christopher Langel, Alpine Meadows, CA (US); Erik Llorente, Spring, TX (US); Hyderuddin Mohammad, Peoria, IL (US); Junwen Li, Oakton, VA (US)

(73) Assignee: Rescale, Inc., San Francisco, CA (US)

( * ) Notice: Subject to any disclaimer, the term of this patent is extended or adjusted under 35 U.S.C. 154(b) by 0 days.

(21) Appl. No.: 18/053,349

(22) Filed: Nov. 7, 2022

(65) Prior Publication Data

US 2023/0185608 A1    Jun. 15, 2023

Related U.S. Application Data

(63) Continuation-in-part of application No. 17/652,924, filed on Feb. 28, 2022, now Pat. No. 11,561,829,
(Continued)

(51) Int. Cl.
*G06F 9/48* (2006.01)
*G06F 8/61* (2018.01)
(Continued)

(52) U.S. Cl.
CPC .............. *G06F 9/4881* (2013.01); *G06F 8/61* (2013.01); *G06F 9/547* (2013.01); *G06F 21/105* (2013.01);
(Continued)

(58) Field of Classification Search
CPC .......... G06F 9/4881; G06F 8/61; G06F 9/547; G06F 21/105; G06F 21/1075;
(Continued)

(56) References Cited

U.S. PATENT DOCUMENTS 7,788,671 B2    8/2010    Black-Ziegelbein et al.
7,856,639 B2    12/2010   Bhagwan et al.
(Continued)

FOREIGN PATENT DOCUMENTS

JP    2011-257792 A    12/2011
JP    2013-218661 A    10/2013
(Continued)

OTHER PUBLICATIONS

Sankaran S, Squyres JM, Barrett B, et al. The Lam/Mpi Checkpoint/Restart Framework: System-Initiated Checkpointing. The International Journal of High Performance Computing Applications. 2005;19(4):479-493. doi: 10.1177/1094342005056139 (Year: 2005).
(Continued)

*Primary Examiner* — Melvin H Pollack
(74) *Attorney, Agent, or Firm* — Klintworth & Rozenblat IP LLP

(57) ABSTRACT

The present invention includes embodiments of systems and methods for facilitating users' selection of compute infrastructure options that satisfy predefined performance goals. The integrated, multi-provider cloud-based platform of the present invention employs abstraction layers for communicating with and integrating the resources of multiple back-end hardware providers, multiple software providers and
(Continued)

multiple license servers. These abstraction layers and associated functionality free users not only from having to implement and configure provider-specific protocols, but also from having to address interdependencies among selected hardware, software and license servers on a job-level basis or at other levels of granularity.

14 Claims, 6 Drawing Sheets

Related U.S. Application Data which is a continuation of application No. 17/316,307, filed on May 10, 2021, now Pat. No. 11,263,045, which is a continuation of application No. 16/399,091, filed on Apr. 30, 2019, now Pat. No. 11,010,194, which is a continuation of application No. 16/008,465, filed on Jun. 14, 2018, now Pat. No. 10,387,198, which is a continuation-in-part of application No. 15/235,004, filed on Aug. 11, 2016, now Pat. No. 10,193,762.

(51) Int. Cl.
*G06F 9/54* (2006.01)
*G06F 21/10* (2013.01)
*H04L 41/00* (2022.01)
*H04L 41/022* (2022.01)
*H04L 67/01* (2022.01)
*H04L 67/53* (2022.01)

(52) U.S. Cl.
CPC ............ *H04L 41/022* (2013.01); *H04L 67/01* (2022.05); *H04L 67/53* (2022.05); *G06F 21/1075* (2023.08); *G06F 21/1078* (2023.08); *H04L 41/20* (2013.01)

(58) Field of Classification Search
CPC ..... G06F 21/1078; H04L 67/01; H04L 67/53; H04L 41/022; H04L 41/20
USPC ......................................................... 709/205
See application file for complete search history.

(56) References Cited

U.S. PATENT DOCUMENTS

| | | | |
|---|---|---|---|
| 8,108,845 B2 | 1/2012 | Little et al. | |
| 8,145,456 B2 * | 3/2012 | Cherkasova | ........ G06F 11/3414 |
| | | | 703/2 |
| 8,301,599 B2 | 10/2012 | Friess et al. | |
| 8,505,005 B1 | 8/2013 | Bos et al. | |
| 8,548,790 B2 | 10/2013 | Tylutki | |
| 8,607,059 B2 | 12/2013 | Mason et al. | |
| 8,706,798 B1 | 4/2014 | Suchter et al. | |
| 8,706,852 B2 | 4/2014 | Kunze et al. | |
| 8,725,798 B2 | 5/2014 | Alam et al. | |
| 8,725,875 B2 | 5/2014 | Supalov | |
| 8,756,609 B2 | 6/2014 | Dasgupta et al. | |
| 8,805,975 B2 | 8/2014 | Schwimer | |
| 8,819,106 B1 | 8/2014 | Sirota et al. | |
| 8,825,751 B2 | 9/2014 | Dominick et al. | |
| 8,826,077 B2 | 9/2014 | Bobak et al. | |
| 8,868,753 B2 | 10/2014 | Luna | |
| 8,904,343 B2 | 12/2014 | Balko et al. | |
| 8,943,191 B2 | 1/2015 | Coffey et al. | |
| 9,003,416 B2 | 4/2015 | Gangemi et al. | |
| 9,009,294 B2 | 4/2015 | Dawson et al. | |
| 9,075,788 B1 | 7/2015 | Roth et al. | |
| 9,098,326 B1 * | 8/2015 | Martin | ..................... G06N 5/02 |
| 9,128,739 B1 | 9/2015 | Juels et al. | |
| 9,158,590 B2 | 10/2015 | Boss et al. | |
| 9,202,239 B2 | 12/2015 | Van Biljon et al. | |
| 9,203,709 B2 | 12/2015 | Beaty et al. | |
| 9,251,481 B2 | 2/2016 | Richter et al. | |
| 9,274,848 B2 | 3/2016 | Dawson et al. | |
| 9,300,536 B2 | 3/2016 | Agarwala et al. | |
| 9,313,133 B2 | 4/2016 | Yeddanapudi et al. | |
| 9,323,580 B2 | 4/2016 | Doyle et al. | |
| 9,323,628 B2 | 4/2016 | Ngo et al. | |
| 9,361,140 B1 | 6/2016 | Gnanadason et al. | |
| 9,411,648 B2 | 8/2016 | Sims | |
| 9,430,280 B1 | 8/2016 | Shih et al. | |
| 9,443,192 B1 | 9/2016 | Cosic | |
| 9,444,764 B2 | 9/2016 | Calvo | |
| 9,465,630 B1 | 10/2016 | Muniz et al. | |
| 9,477,533 B2 | 10/2016 | Eastep et al. | |
| 9,503,310 B1 | 11/2016 | Hawkes et al. | |
| 9,507,748 B2 | 11/2016 | Hipp et al. | |
| 9,553,823 B2 | 1/2017 | Southern et al. | |
| 9,569,271 B2 | 2/2017 | Farhan et al. | |
| 9,569,480 B2 | 2/2017 | Provencher et al. | |
| 9,588,795 B2 | 3/2017 | Mcwilliams et al. | |
| 9,600,344 B2 | 3/2017 | De et al. | |
| 9,613,064 B1 | 4/2017 | Chou et al. | |
| 9,635,101 B2 | 4/2017 | Mathur et al. | |
| 9,659,251 B2 | 5/2017 | Tang et al. | |
| 9,703,584 B2 | 7/2017 | Kottomtharayil et al. | |
| 9,712,542 B1 | 7/2017 | Brandwine | |
| 9,716,334 B1 | 7/2017 | Thompson | |
| 9,716,634 B2 | 7/2017 | Sapuram et al. | |
| 9,733,971 B2 | 8/2017 | Cropper et al. | |
| 9,734,280 B2 | 8/2017 | Jiang et al. | |
| 9,747,136 B2 | 8/2017 | Sathyamurthy et al. | |
| 9,749,174 B1 | 8/2017 | Goff et al. | |
| 9,769,749 B2 | 9/2017 | Buck et al. | |
| 9,781,205 B2 | 10/2017 | Batrouni et al. | |
| 9,811,849 B2 | 11/2017 | Bursey | |
| 9,813,318 B2 | 11/2017 | Iyoob et al. | |
| 9,825,881 B2 | 11/2017 | Johnston et al. | |
| 9,846,595 B2 | 12/2017 | Cao et al. | |
| 9,851,953 B2 | 12/2017 | Straub et al. | |
| 9,860,193 B2 | 1/2018 | Madduri et al. | |
| 9,864,939 B2 | 1/2018 | Naitoh | |
| 9,866,638 B2 | 1/2018 | Heymann et al. | |
| 9,870,250 B2 | 1/2018 | George et al. | |
| 9,870,261 B2 * | 1/2018 | Cao | .......................... G06F 8/61 |
| 9,870,593 B2 | 1/2018 | Sedighy et al. | |
| 9,871,857 B2 | 1/2018 | Russinovich et al. | |
| 9,872,195 B2 | 1/2018 | Sharma et al. | |
| 9,882,798 B2 | 1/2018 | Padala et al. | |
| 9,886,267 B2 * | 2/2018 | Maheshwari | ......... G06F 9/5072 |
| 9,898,393 B2 | 2/2018 | Moorthi et al. | |
| 9,904,579 B2 | 2/2018 | Shear et al. | |
| 9,910,708 B2 | 3/2018 | Williamson | |
| 9,916,135 B2 * | 3/2018 | Dube | ...................... H04L 41/14 |
| 9,916,233 B1 | 3/2018 | Qureshi et al. | |
| 9,916,538 B2 | 3/2018 | Zadeh et al. | |
| 9,923,952 B2 | 3/2018 | Maes et al. | |
| 9,967,146 B2 | 5/2018 | Franke et al. | |
| 9,967,267 B2 | 5/2018 | Ladnai et al. | |
| 9,967,318 B2 | 5/2018 | Fu et al. | |
| 9,971,880 B2 | 5/2018 | Ferris et al. | |
| 9,976,617 B2 | 5/2018 | Campbell et al. | |
| 9,979,617 B1 | 5/2018 | Meyer et al. | |
| 9,979,780 B1 | 5/2018 | Faibish et al. | |
| 9,984,044 B2 | 5/2018 | Dunne et al. | |
| 9,985,859 B2 | 5/2018 | Lin | |
| 9,992,072 B1 | 6/2018 | Chen et al. | |
| 10,001,389 B1 | 6/2018 | Das et al. | |
| 10,007,555 B1 | 6/2018 | Kuhne | |
| 10,013,289 B2 | 7/2018 | Kung et al. | |
| 10,015,106 B1 | 7/2018 | Florissi et al. | |
| 10,031,783 B2 | 7/2018 | Jalagam et al. | |
| 10,033,595 B2 | 7/2018 | Sif et al. | |
| 10,038,721 B2 | 7/2018 | Overby et al. | |
| 10,038,731 B2 | 7/2018 | Pearl et al. | |
| 10,042,903 B2 | 8/2018 | Dhayapule et al. | |
| 10,044,640 B1 | 8/2018 | Levine et al. | |
| 10,049,337 B2 | 8/2018 | Mack et al. | |
| 10,051,041 B2 | 8/2018 | Reddy et al. | |
| 10,051,082 B2 | 8/2018 | Borley et al. | |

(56) References Cited

U.S. PATENT DOCUMENTS

| | | |
|---|---|---|
| 10,057,186 B2 | 8/2018 | Jia et al. |
| 10,062,354 B2 | 8/2018 | Dutt |
| 10,063,942 B2 | 8/2018 | Donaghey et al. |
| 10,069,693 B1 | 9/2018 | Daptardar et al. |
| 10,069,907 B2 | 9/2018 | Tung et al. |
| 10,073,880 B2 | 9/2018 | Li et al. |
| 10,075,384 B2 | 9/2018 | Shear et al. |
| 10,075,442 B2 | 9/2018 | Simpson et al. |
| 10,079,877 B2 | 9/2018 | Paramasivam |
| 10,082,786 B2 | 9/2018 | Sait et al. |
| 10,084,721 B2 | 9/2018 | Biswas et al. |
| 10,089,147 B2 | 10/2018 | Jamjoom et al. |
| 10,095,539 B2 | 10/2018 | Barker et al. |
| 10,095,597 B2 | 10/2018 | Jain et al. |
| 10,095,800 B1 | 10/2018 | Yalamanchi |
| 10,097,410 B2 | 10/2018 | Singh et al. |
| 10,101,981 B2 | 10/2018 | Arumugam et al. |
| 10,108,683 B2 | 10/2018 | Dhayapule et al. |
| 10,110,502 B1 | 10/2018 | Viswanathan |
| 10,120,724 B2 | 11/2018 | Badjatia et al. |
| 10,120,907 B2 | 11/2018 | De Castro Alves et al. |
| 10,129,078 B2 | 11/2018 | Kumar et al. |
| 10,129,344 B2 | 11/2018 | Pogrebinsky et al. |
| 10,135,701 B2 | 11/2018 | Wu et al. |
| 10,135,712 B2 | 11/2018 | Wu et al. |
| 10,140,163 B2 | 11/2018 | Eda et al. |
| 10,146,592 B2 | 12/2018 | Bishop et al. |
| 10,146,598 B1 | 12/2018 | Pendry et al. |
| 10,148,736 B1 | 12/2018 | Lee et al. |
| 10,151,782 B2 | 12/2018 | Sum et al. |
| 10,152,357 B1* | 12/2018 | Espy .................. G06F 11/3051 |
| 10,152,516 B2 | 12/2018 | Fawcett |
| 10,153,941 B2 | 12/2018 | Dion et al. |
| 10,157,124 B1 | 12/2018 | Desimone et al. |
| 10,158,743 B2 | 12/2018 | Deuri et al. |
| 10,162,682 B2 | 12/2018 | Smola et al. |
| 10,162,684 B2 | 12/2018 | Feng et al. |
| 10,169,086 B2 | 1/2019 | Cropper et al. |
| 10,169,130 B2 | 1/2019 | Addison et al. |
| 10,171,287 B2 | 1/2019 | An et al. |
| 10,178,184 B2 | 1/2019 | Dorr et al. |
| 10,182,103 B2 | 1/2019 | Koushik et al. |
| 10,191,778 B1 | 1/2019 | Yang et al. |
| 10,191,802 B2 | 1/2019 | Nautiyal et al. |
| 10,198,281 B2 | 2/2019 | Thakkar et al. |
| 10,225,164 B2 | 3/2019 | Revanuru |
| 10,230,529 B2 | 3/2019 | Costa et al. |
| 10,243,787 B2 | 3/2019 | Coote |
| 10,275,280 B2 | 4/2019 | Borlick et al. |
| 10,282,222 B2 | 5/2019 | Thakkar et al. |
| 10,303,576 B1 | 5/2019 | Seymour et al. |
| 10,305,814 B2 | 5/2019 | Conner et al. |
| 10,310,903 B2 | 6/2019 | Mcpherson et al. |
| 10,326,845 B1 | 6/2019 | Jaeger |
| 10,355,870 B2 | 7/2019 | Cropper et al. |
| 10,356,206 B2 | 7/2019 | Chen et al. |
| 10,360,122 B2 | 7/2019 | Morgan |
| 10,372,421 B2 | 8/2019 | Mack et al. |
| 10,373,218 B1 | 8/2019 | Jenkins et al. |
| 10,379,906 B2 | 8/2019 | Qi et al. |
| 10,387,198 B2 | 8/2019 | Poort et al. |
| 10,387,208 B2 | 8/2019 | Nahir et al. |
| 10,387,402 B2 | 8/2019 | Stefani et al. |
| 10,387,415 B2* | 8/2019 | Chainani ............ G06F 16/2471 |
| 10,387,798 B2* | 8/2019 | Duggan ................ G06F 9/5055 |
| 10,389,850 B2* | 8/2019 | Fawcett ................ H04L 41/082 |
| 10,395,195 B2 | 8/2019 | Kapasi et al. |
| 10,404,795 B2 | 9/2019 | Antony |
| 10,411,975 B2* | 9/2019 | Martinez ................ H04L 41/40 |
| 10,412,192 B2 | 9/2019 | Iqbal et al. |
| 10,417,613 B1* | 9/2019 | Brisebois .............. G06F 21/554 |
| 10,425,411 B2 | 9/2019 | Huang |
| 10,430,263 B2 | 10/2019 | Polar Seminario |
| 10,438,132 B2* | 10/2019 | Duggan .................. G06F 16/22 |
| 10,447,757 B2 | 10/2019 | Adam et al. |
| 10,452,451 B2 | 10/2019 | Miraftabzadeh et al. |
| 10,452,605 B2 | 10/2019 | Wang et al. |
| 10,466,754 B2 | 11/2019 | Eastep et al. |
| 10,467,036 B2 | 11/2019 | Anwar et al. |
| 10,469,390 B2 | 11/2019 | Amulothu et al. |
| 10,474,502 B2 | 11/2019 | Agrawal et al. |
| 10,491,537 B2 | 11/2019 | Wang |
| 10,491,662 B2 | 11/2019 | Srikanth et al. |
| 10,515,326 B2 | 12/2019 | Waltz |
| 10,516,623 B2 | 12/2019 | Leafe et al. |
| 10,523,518 B2* | 12/2019 | Fawcett .................. H04L 41/14 |
| 10,530,837 B2 | 1/2020 | Bala et al. |
| 10,534,796 B1 | 1/2020 | Lieberman et al. |
| 10,536,353 B2* | 1/2020 | Gupta ..................... H04L 67/51 |
| 10,545,474 B2 | 1/2020 | Cella et al. |
| 10,552,774 B2 | 2/2020 | Shih et al. |
| 10,560,353 B1 | 2/2020 | Stickle |
| 10,567,479 B2* | 2/2020 | Tal ......................... G06Q 50/01 |
| 10,574,523 B2 | 2/2020 | Eicken et al. |
| 10,594,798 B2 | 3/2020 | Rodrigues Nascimento et al. |
| 10,599,471 B1* | 3/2020 | Hilton ....................... G06F 9/48 |
| 10,599,545 B2 | 3/2020 | Ko et al. |
| 10,614,018 B2 | 4/2020 | Fawcett |
| 10,623,481 B2 | 4/2020 | Snider et al. |
| 10,652,164 B2 | 5/2020 | Garcia et al. |
| 10,659,523 B1 | 5/2020 | Joseph et al. |
| 10,671,628 B2 | 6/2020 | Sullivan et al. |
| 10,678,602 B2* | 6/2020 | Manglik .................... G06F 8/61 |
| 10,691,502 B2 | 6/2020 | Burke et al. |
| 10,701,148 B2 | 6/2020 | Varney et al. |
| 10,713,575 B2* | 7/2020 | Chawla ................... G06Q 30/02 |
| 10,713,589 B1 | 7/2020 | Zarandioon et al. |
| 10,733,017 B2* | 8/2020 | Kim ....................... G06F 9/4893 |
| 10,735,348 B2* | 8/2020 | Aharonov ............. H04L 47/822 |
| 10,742,731 B2 | 8/2020 | Brown et al. |
| 10,747,573 B2* | 8/2020 | Fountain ............... G06F 9/4881 |
| 10,783,504 B2 | 9/2020 | Ferris et al. |
| 10,789,272 B2 | 9/2020 | Jennery et al. |
| 10,803,401 B2* | 10/2020 | Hammond ............... G06N 3/08 |
| 10,805,414 B2 | 10/2020 | Boss et al. |
| 10,817,530 B2* | 10/2020 | Siebel ...................... H04L 67/53 |
| 10,826,751 B2* | 11/2020 | Peco ........................ H04W 4/08 |
| 10,877,796 B1 | 12/2020 | Kinney et al. |
| 10,884,807 B2 | 1/2021 | Shimamura et al. |
| 10,891,569 B1 | 1/2021 | Werner |
| 10,942,724 B2 | 3/2021 | Spivak et al. |
| 11,029,998 B2 | 6/2021 | Burke et al. |
| 11,036,696 B2 | 6/2021 | Higginson et al. |
| 11,244,261 B2 | 2/2022 | To et al. |
| 11,249,710 B2* | 2/2022 | Li ............................. G06F 3/14 |
| 11,281,498 B1* | 3/2022 | Kinney, Jr. ........... G06F 9/4881 |
| 11,303,539 B2* | 4/2022 | Cimprich ................ H04L 41/14 |
| 2004/0268337 A1 | 12/2004 | Culter |
| 2007/0214455 A1 | 9/2007 | Williams et al. |
| 2009/0157419 A1 | 6/2009 | Bursey |
| 2009/0300017 A1 | 12/2009 | Tokusho et al. |
| 2010/0251031 A1 | 9/2010 | Nieh et al. |
| 2011/0131315 A1 | 6/2011 | Ferris et al. |
| 2011/0138050 A1 | 6/2011 | Dawson et al. |
| 2012/0139929 A1 | 6/2012 | Kaza et al. |
| 2013/0031035 A1 | 1/2013 | Jeanne et al. |
| 2013/0174146 A1 | 7/2013 | Dasgupta et al. |
| 2013/0242335 A1 | 9/2013 | Naitoh |
| 2013/0318211 A1 | 11/2013 | Kent et al. |
| 2014/0282536 A1 | 9/2014 | Dave et al. |
| 2015/0012669 A1 | 1/2015 | Hipp et al. |
| 2015/0082316 A1 | 3/2015 | Zaldivar et al. |
| 2015/0242234 A1 | 8/2015 | Harris et al. |
| 2015/0256475 A1 | 9/2015 | Suman et al. |
| 2015/0293669 A1 | 10/2015 | Prichard |
| 2015/0365953 A1 | 12/2015 | Papadopoulos et al. |
| 2016/0013966 A1 | 1/2016 | Vaidyanathan et al. |
| 2016/0034995 A1 | 2/2016 | Williams et al. |
| 2016/0048408 A1 | 2/2016 | Madhu et al. |
| 2016/0070457 A1 | 3/2016 | Furtwangler et al. |
| 2016/0125511 A1 | 5/2016 | Shaaban et al. |
| 2016/0227276 A1 | 8/2016 | Zou et al. |
| 2016/0285957 A1 | 9/2016 | Haserodt et al. |
| 2016/0306678 A1 | 10/2016 | Hira et al. |

(56) References Cited

U.S. PATENT DOCUMENTS

| | | |
|---|---|---|
| 2017/0013021 A1 | 1/2017 | Hoy et al. |
| 2017/0024508 A1 | 1/2017 | Mneimneh et al. |
| 2017/0060609 A1 | 3/2017 | Cropper et al. |
| 2017/0090970 A1 | 3/2017 | Baskaran et al. |
| 2017/0116022 A1 | 4/2017 | Khalid et al. |
| 2017/0126820 A1 | 5/2017 | Mcclain et al. |
| 2017/0134237 A1 | 5/2017 | Yang et al. |
| 2017/0134242 A1* | 5/2017 | Ridl .................... H04L 41/16 |
| 2017/0147398 A1 | 5/2017 | Chen et al. |
| 2017/0163732 A1 | 6/2017 | Saraf et al. |
| 2017/0185609 A1 | 6/2017 | Braghin et al. |
| 2017/0187791 A1 | 6/2017 | Bayon-Molino et al. |
| 2017/0208138 A1 | 7/2017 | Baxter |
| 2017/0235605 A1 | 8/2017 | Chaloupka et al. |
| 2017/0262825 A1 | 9/2017 | Conway et al. |
| 2017/0272349 A1 | 9/2017 | Hopkins et al. |
| 2017/0293980 A1 | 10/2017 | Phillips et al. |
| 2017/0308685 A1 | 10/2017 | Terry et al. |
| 2017/0329581 A1 | 11/2017 | Jann et al. |
| 2017/0329879 A1 | 11/2017 | Sales De Castro et al. |
| 2017/0331829 A1 | 11/2017 | Lander et al. |
| 2017/0371709 A1 | 12/2017 | Harper et al. |
| 2017/0371721 A1 | 12/2017 | Yu et al. |
| 2017/0374151 A1 | 12/2017 | Moorthi et al. |
| 2018/0004868 A1 | 1/2018 | Adam et al. |
| 2018/0007127 A1 | 1/2018 | Salapura et al. |
| 2018/0018204 A1 | 1/2018 | Zhang et al. |
| 2018/0018745 A1 | 1/2018 | Lisanti et al. |
| 2018/0024964 A1 | 1/2018 | Mao et al. |
| 2018/0025007 A1 | 1/2018 | Dai |
| 2018/0041578 A1 | 2/2018 | Lee et al. |
| 2018/0046926 A1 | 2/2018 | Achin et al. |
| 2018/0060138 A1 | 3/2018 | Whitehead et al. |
| 2018/0060760 A1 | 3/2018 | Permeh et al. |
| 2018/0067776 A1 | 3/2018 | Chen et al. |
| 2018/0107390 A1 | 4/2018 | Bae et al. |
| 2018/0152392 A1 | 5/2018 | Reed et al. |
| 2018/0191867 A1 | 7/2018 | Siebel et al. |
| 2018/0198680 A1 | 7/2018 | Mladin et al. |
| 2018/0262388 A1 | 9/2018 | Johnson et al. |
| 2018/0316572 A1 | 11/2018 | Kamalakantha et al. |
| 2018/0316750 A1 | 11/2018 | Iyengar et al. |
| 2018/0357097 A1 | 12/2018 | Poort et al. |
| 2018/0365047 A1 | 12/2018 | Karve et al. |
| 2019/0012197 A1 | 1/2019 | Memon et al. |
| 2019/0138725 A1 | 5/2019 | Gupta |
| 2019/0163842 A1 | 5/2019 | Pal et al. |
| 2019/0258560 A1 | 8/2019 | Weissinger et al. |
| 2020/0201854 A1 | 6/2020 | Miller |
| 2021/0191767 A1* | 6/2021 | Unrau .................... G06F 9/48 |

FOREIGN PATENT DOCUMENTS

| | | |
|---|---|---|
| JP | 2017-068480 A | 4/2017 |
| JP | 2017-142824 A | 8/2017 |
| JP | 2017-529633 A | 10/2017 |
| WO | WO2018/031792 A1 | 2/2018 |

OTHER PUBLICATIONS

A. Raveendran, T. Bicer and G. Agrawal, "A Framework for Elastic Execution of Existing MPI Programs," 2011 IEEE International Symposium on Parallel and Distributed Processing Workshops and Phd Forum, Shanghai, 2011, pp. 940-947, doi: 10.1109/IPDPS.2011. 240. (Year: 2011).

Anton Beloglazov, Jemal Abawajy, Rajkumar Buyya, "Energy-aware resource allocation heuristics for efficient management of data centers for Cloud computing," Future Generation Computer Systems, vol. 28, Issue 5, 2012, pp. 755-768. (Year: 2012).

C. Di Martino, W. Kramer, Z. Kalbarczyk and R. Iyer, "Measuring and Understanding Extreme-Scale Application Resilience: A Field Study of 5,000,000 HPC Application Runs," 2015 45th Annual IEEE/IFIP International Conference on Dependable Systems and Networks, Rio de Janeiro, 2015, pp. 25-36 (Year: 2015).

C. Zou, H. Deng and Q. Qiu, "Design and Implementation of Hybrid Cloud Computing Architecture Based on Cloud Bus," 2013 IEEE 9th International Conference on Mobile Ad-hoc and Sensor Networks, Dalian, 2013, pp. 289-293, doi: 10.1109/MSN.2013.72. (Year: 2013).

H. Fu, Z. Li, C. Wu and X. Chu, "Core-Selecting Auctions for Dynamically Allocating Heterogeneous VMs in Cloud Computing," 2014 IEEE 7th International Conference on Cloud Computing, Anchorage, AK, 2014, pp. 152-159, doi: 10.1109/CLOUD.2014.30. (Year: 2014).

Hameed, A., Khoshkbarforoushha, A., Ranjan, R et al. A survey and taxonomy on energy efficient resource allocation techniques for cloud computing systems. Computing 98, 751-774 (2016). https://doi.org/10.1007/s00607-014-0407-8 (Year: 2016).

International Search Report and Written Opinion for PCT Application No. PCT/US2017/046323 dated Jan. 17, 2018, 16 pages.

International Search Report and Written Opinion for PCT Application No. PCT/US2019/036426 dated Oct. 4, 2019, 6 pages.

Johan Tordsson et al. "Cloud brokering mechanisms for optimized placement of virtual machines across multiple providers," Future Generation Computer Systems, vol. 28, Issue 2, 2012, pp. 358-367. (Year: 2012).

N. Loutas, E. Kamateri and K. Tarabanis, "A Semantic Interoperability Framework for Cloud Platform as a Service," 2011 IEEE Third International Conference on Cloud Computing Technology and Science, Athens, 2011, pp. 280-287, doi: 10.1109/CloudCom. 2011.45. (Year: 2011).

O. Laadan, D. Phung and J. Nieh, "Transparent Checkpoint-Restart of Distributed Applications on Commodity Clusters," 2005 IEEE International Conference on Cluster Computing, Burlington, MA, 2005, pp. 1-13, doi: 10.1109/CLUSTR.2005.347039. (Year: 2015).

Prodan R et al., "A survey and taxonomy of infrastructure as a service and web hosting cloud providers", Grid Computing, 2009 10TH IEEE/Acm International Conference on, IEEE, Piscataway, NJ, USA, (Oct. 13, 2009), ISBN 978-1-4244-5148-7, pp. 17-25, XP031580147 [A] 1-7.

The Ro, the Cheulwoo. "Modeling of Virtual Switch in Cloud System." Journal of Digital Convergence, the vol. 11, the No. 12, the Korea digital policy learned society, the Dec. 2013, and the pp. 479-485, doi: 10.14400 / JDPM.2013.11.12.479.

U. Sharma, P. Shenoy, S. Sahu and A. Shaikh, "A Cost-Aware Elasticity Provisioning System for the Cloud," 2011 31st International Conference on Distributed Computing Systems, Minneapolis, MN, 2011, pp. 559-570, doi: 10.1109/ICDCS.2011.59. (Year: 2011).

W. Chen, X. Qiao, J. Wei and T. Huang, "A Profit-Aware Virtual Machine Deployment Optimization Framework for Cloud Platform Providers," 2012 IEEE Fifth International Conference on Cloud Computing, Honolulu, HI, 2012, pp. 17-24, doi: 10.1109/CLOUD. 2012.60. (Year: 2012). *.

* cited by examiner

COMPUTE INFRASTRUCTURE PERFORMANCE DATABASE

| INPUTS | | | | | | MEASUREMENTS | | | | CORE TYPE PERFORMANCE | | | CALCULATIONS | | |
|---|---|---|---|---|---|---|---|---|---|---|---|---|---|---|---|
| SW CAT | SW APP | BENCHMARK | CORE TYPE | CORES/NODE | CORE COUNT | DURATION (HOURS) | CPU UTILIZATION | MEM BANDWIDTH | HW SIGNATURE (HW PROFILES) | NETWORK LATENCY | CPU | MEM | NTWK | RPI | RSS | PRIORITIZED BOTTLENECKS |
| CFD | STAR-CCM+ | BENCHMARK #2 | CT #1 (BASELINE) | 36 | 72 | 8.0 | | | | | | | | | 0.9 | |
| | | | | | 144 | 4.0 | | | | | 0.9 | 0.5 | 0.4 | 1.0 | 0.7 | |
| | | | | | 576 | 2.0 | | | | | | | | | 0.0 | NTWK 95% CPU 25% MEM 15% |
| | | | | | 1152 | 1.5 | | | | | | | | | -0.2 | |
| | | | CT #2 | 32 | 64 | 7.0 | | | | | | | | | 0.9 | |
| | | | | | 256 | 3.9 | | | | | 0.9 | 0.6 | 0.5 | 1.1 | 0.8 | |
| | | | | | 512 | 1.9 | | | | | | | | | 0.0 | |
| | | | | | 1024 | 1.4 | | | | | | | | | -0.2 | |
| | | | CT #3 | 64 | 64 | 9.0 | | | | | | | | | 0.8 | |
| | | | | | 256 | 5.0 | | | | | 0.8 | 0.7 | 0.2 | 0.7 | 0.7 | |
| | | | | | 512 | 4.0 | | | | | | | | | -0.1 | |
| | | | | | 1024 | 3.5 | | | | | | | | | -0.3 | |
| | | BENCHMARK #2 | CT #1 (BASELINE) | 36 | 72 | 8.0 | | | | | | | | | 1.0 | |
| | | | | | 144 | 4.0 | | | | | 0.9 | 0.5 | 0.4 | 1.0 | 0.8 | |
| | | | | | 576 | 2.0 | | | | | | | | | 0.2 | NTWK 65% CPU 20% MEM 10% |
| | | | | | 1152 | 1.5 | | | | | | | | | 0.0 | |
| | | | CT #2 | 32 | 64 | 7.0 | | | | | | | | | 0.9 | |
| | | | | | 256 | 4.0 | | | | | 0.9 | 0.6 | 0.5 | 1.2 | 0.9 | |
| | | | | | 512 | 2.0 | | | | | | | | | 0.2 | |
| | | | | | 1024 | 1.5 | | | | | | | | | 0.0 | |
| | | | CT #3 | 64 | 64 | 9.0 | | | | | | | | | 1.0 | |
| | | | | | 256 | 5.0 | | | | | 0.8 | 0.7 | 0.2 | 0.7 | 0.9 | |
| | | | | | 512 | 4.0 | | | | | | | | | 0.2 | |
| | | | | | 1024 | 3.5 | | | | | | | | | 0.0 | |
| | ANSYS FLUENT | BENCHMARK #2 | CT #1 (BASELINE) | | 72 | ETC | ETC | ETC | ETC | ETC | ETC | ETC | ETC | ETC | ETC | ETC |
| | | | | | 144 | ETC | ETC | ETC | ETC | ETC | ETC | ETC | ETC | ETC | ETC | |
| | | | | | 576 | ETC | ETC | ETC | ETC | ETC | ETC | ETC | ETC | ETC | ETC | |
| | | | | | 1152 | ETC | ETC | ETC | ETC | ETC | ETC | ETC | ETC | ETC | ETC | |

*** SUBSEQUENT BENCHMARK RUNS (ACROSS SW CATS/APPS) FOLLOW SIMILAR PATTERN FOR VARIOUS CORE TYPE AND CORE COUNTS ***

FIG. 3

COMPUTE RECOMMENDATION ENGINE

CROSS-REFERENCE TO RELATED APPLICATIONS

This application is a continuation-in-part of U.S. patent application Ser. No. 17/652,924, filed Feb. 28, 2022, which is a continuation of U.S. patent application Ser. No. 17/316,307, filed May 10, 2021 and issued Mar. 1, 2022 as U.S. Pat. No. 11,263,045, which is a continuation of U.S. patent application Ser. No. 16/399,091, filed Apr. 30, 2019 and issued May 18, 2021 as U.S. Pat. No. 11,010,194, which is a continuation of U.S. patent application Ser. No. 16/008,465, filed Jun. 14, 2018 and issued Aug. 20, 2019 as U.S. Pat. No. 10,387,198, which is a continuation-in-part of U.S. patent application Ser. No. 15/235,004, filed Aug. 11, 2016 and issued Jan. 29, 2019 as U.S. Pat. No. 10,193,762, the disclosures of which are hereby incorporated by reference as if fully set forth herein.

BACKGROUND

Field of Art

The present invention relates generally to cloud-based platforms, and in particular to a cloud-based compute platform that resolves for end users compute performance and other interdependencies that result from integrating third-party back-end hardware with third-party software across multiple providers.

Description of Related Art

Beginning with the advent of supercomputing in the 1960s, "high performance computing" (HPC) tasks were relegated to high-end expensive computer systems that only large companies could afford. HPC tasks are sometimes characterized narrowly (in Wikipedia and elsewhere) as requiring large amounts of computing resources for relatively short periods of time.

Such a characterization facilitates distinctions from other forms of supercomputing (HTC or "high-throughput computing", grid computing, MTC or "many-task computing" and others). We use the term HPC more broadly herein to encompass virtually all forms of supercomputing in which significant computing resources are required, even if only on a temporary basis—whether jobs consist of single tasks or multiple dependent and independent tasks, or are optimized for cost, use of computational resources, time required to complete individual tasks or an overall job, or other factors.

The PC revolution of the 1970s brought about a shift in traditional paradigms of client-server computing. Computing evolved gradually from server-based extremes (users of "dumb terminals" executing time-sharing tasks on remote mainframes and other high-end servers) to client-based extremes (users performing mostly local tasks on gradually more powerful personal computers), and eventually to hybrid forms of client-server computing in which distributed networks such as the Internet facilitate the hosting of an amalgam of hardware, software and networking services.

In these hybrid client-server environments, computing resources and functionality are allocated in many different ways across hosted servers and end-user clients. Yet, HPC tasks remained limited to server-based extremes, as they required high-end computing resources not typically available on a personal computer or even a single more powerful server.

With the emergence of cloud computing in the mid-2000s, HPC functionality became much more widely accessible and affordable to individuals and small companies, as well as large enterprises. Remote "on-demand" access to large amounts of computing resources dramatically lowered costs (and thus expanded access) by distributing the functionality of "high-demand" tasks across a vast array of networked physical and virtual computing resources. While cloud computing also provided hybrid client-server solutions in many other contexts, it offered a unique "distributed server-based" solution to the HPC world.

However, cloud computing has not been a panacea to HPC users. Significant problems remain due to the relative complexity of HPC jobs in comparison to traditional client-server and remote desktop applications. For example, before cloud computing, large enterprises purchased or leased expensive high-end servers and other computing resources and operated them on their own premises. While enterprises had the flexibility of selecting computing resources that matched their specific demands, the overhead cost of such computing resources was in many cases difficult to justify. The highest-end computing resources were required only for certain compute-intensive jobs, and sometimes only for certain portions of such jobs. In essence, enterprises had to plan for a "worst-case scenario."

Large enterprises relying on their own "on-premise" hardware often sacrificed access to the latest computing resources. Purchased or leased hardware is typically replaced toward the end of its lifecycle, by which point it is several years old and one or more generations behind the latest technology.

Moreover, end users were required to install and configure on their hardware each third-party software package (i.e., application) they licensed from third-party "independent software vendors" or "ISVs." Unlike installing a traditional desktop application, which requires little more than ensuring that the correct operating system is present, installing compute-intensive software is a more complex process due to the nature of HPC functionality. Such software frequently executes in parallel, with multiple instances of the software executing across multiple CPU cores, and often across multiple physical servers. Each job requires a unique configuration matching the requirements of the software to the hardware environment, including job-specific attributes relating to a user's compute model.

End users were responsible for addressing these hardware-software dependencies by matching the demands of each job to the hardware environment—wholly apart from the complexities of sharing the computing resources of that hardware environment with other end users within the enterprise running jobs in parallel. Moreover, end users were solely responsible for testing or "tuning" the software and hardware environment, and for generating "workflows" across and within individual jobs (such as extracting and analyzing intermediate as well as final results, combining multiple tasks in which the output of one task serves as the input to a subsequent task, perhaps based on various conditions, and an array of other more complex intra-job and inter-job functionality). In this context, we use the terms workflow, jobs and tasks somewhat interchangeably, though a workflow typically represents one or more jobs, each of which consists of one or more individual HPC tasks.

Even the introduction of public cloud services—such as Amazon's AWS ("Amazon Web Services, including "Elastic Compute Cloud" or EC2), Microsoft's "Azure" and Google's "Google Cloud Platform (GCP)—only partially addressed these problems. These public cloud platforms are often described as "infrastructure-as-a-service" or IaaS. In other words, these "back-end hardware providers" provide remote access to physical and virtual computing environments that obviate the need to purchase or lease hardware computing resources for a worst-case scenario. Such computing resources can be accessed remotely on an on-demand basis to dramatically lower costs.

In addition to public cloud providers, other back-end hardware providers provide "private clouds" or "private data centers" which often sacrifice virtualization functionality (and thus some level of security) in favor of high-end "bare metal" hardware designed for demanding HPC applications. For example, the provisioning of physical servers facilitates the use of faster networking technologies for intra-job communication, as such servers can be tightly coupled given their close proximity to one another. As with public cloud services (or essentially any "cloud service provider" or "CSP"), the computing resources of bare-metal providers can be accessed remotely on an on-demand basis to reduce costs.

However, whether an enterprise utilizes public clouds or private data centers (or a combination thereof, including their own physical hardware), most of the other problems referenced above remain—due to the interdependencies among various attributes of HPC tasks and the hardware and software environment in which they are executed. HPC users are still responsible for selecting the physical or virtual hardware environment that best addresses their needs.

For example, if certain jobs require the latest bare-metal hardware (which often comes at a premium cost), while other jobs require the flexibility of virtualization, users must either sacrifice one for the other, or incur the added complexity of contracting with multiple different back-end hardware providers. Moreover, users still must manage the differences among each of those hardware environments. Many cloud providers offer virtual "core types" with specified amounts of available computing resources, such as CPU cores, memory, storage, and network bandwidth. Bare-metal providers, on the other hand, offer more limited (but often more powerful) choices of computing resources based on the characteristics of their physical servers.

Even with these choices, users cannot simply specify their computing resource needs at a higher-level of abstraction, and have such needs automatically allocated among the various types of computing resources available from multiple back-end hardware providers. They are responsible for making such determinations on their own, often with incomplete information. HPC users are focused on their own needs, and not on the frequently-changing offerings of various back-end hardware providers. Moreover, any given enterprise lacks the volume of usage across multiple providers necessary to obtain the most cost-efficient pricing.

HPC users also sacrifice the ability to "mix and match" the computing resource demands of any particular job with the computing resources offered across multiple back-end hardware providers (including their own on-premise hardware). For example, they cannot execute a job that utilizes the high-end computing power of a bare-metal provider with their own existing storage, or that of a cloud provider. There is simply a lack of integration among the many different back-end hardware providers.

Moreover, even if HPC users could select from core type, core count and other "compute infrastructure" choices across different CSPs to run their jobs, the determination of which compute infrastructure will best satisfy their goals (e.g., regarding lowest cost, shortest duration or some combination of these and other related factors) is far from simple. As will become apparent, there are many variables that affect the resulting performance (e.g., the cost and duration) of HPC jobs, including simulations and other compute-intensive workloads. While the following description of the background and features of the present invention focuses on simulation applications, the underlying principles and concepts are equally applicable to other types of HPC applications and virtually any application involving a compute-intensive workload (including, for example, applications which perform calculations on user inputs other than simulation compute models).

To run a job, a user first selects a particular software application. Simulation software applications cover a vast expanse of industries and types of systems being modeled, including weather forecasting, flight simulation, car crash modeling, semiconductor design and many others.

Such software is often categorized by the type of mathematical approaches employed to model a particular system. For example, "finite element analysis" ("FEA") is a common category of simulation applications often employed for analysis of solid structures using the "finite element method" ("FEM") of solving partial differential equations. Another common category of simulation applications, "computational fluid dynamics" ("CFD"), is often employed for analysis of fluid flow within a system using the "finite volume method" ("FVM") of representing partial differential equations in the form of algebraic equations. Of course, different mathematical approaches and categories of simulation software may be deemed best-suited to the simulation of a particular system (whether involving solid structures, fluids and/or other types of elements, such as the layout or functionality of semiconductor components), and thus may influence the selection of a particular simulation software application.

Regardless of its category or mathematical approach, the selected software application will take as input the user's proprietary model (referred to herein as the "User Model" or "User Input Model"), and will "run the model" on the particular compute infrastructure specified by the user. As a result, the performance of that job (e.g., its duration and cost) depends not only on the particular software and the specified compute infrastructure, but also on the user's proprietary User Input Model.

ISVs, computer hardware manufacturers and others have developed "benchmarks" in an effort to enable users to compare and select from different compute infrastructure choices (e.g., core types and core counts). In lieu of a User Input Model, these benchmarks are designed to be representative of how a particular software application (and perhaps other applications within the same category) will perform.

For example, an ISV can develop or employ a particular benchmark to "benchmark the performance" of its software applications across different compute infrastructure. Each "benchmark simulation" (or "benchmark run") involves the associated software application "running the benchmark" on a particular core count of a core type, yielding performance metrics including the duration of the benchmark run. For example, a user can perform multiple benchmark runs (employing a benchmark designed for its chosen software application or category), and then compare the duration (perhaps normalized for cost) of each specified "core type/count" combination.

There are a number of shortcomings, however, in relying on benchmarks to determine the "optimal" compute infrastructure, or at least the compute infrastructure options that best satisfy the user's goals. For example, some users may prefer the fastest or shortest duration option, while others may prefer the lowest cost option (with job cost determined based on the "per core-hour" price charged by a CSP for a particular core type). Still others may prefer options based on a combination of the two (e.g., shortest duration under $10 or lowest cost under two hours). Users could even specify a more precise "User Goal" that is a function of cost, duration and/or other related factors.

But benchmarks, even those associated with the particular software application chosen by a user, have not proven to be sufficiently representative of the resulting performance of prospective jobs involving a user's proprietary User Input Model. There are a number of significant reasons why benchmarks are poor substitutes for User Input Models, and why the performance of a software application running a benchmark is not a reliable or accurate indicator of the performance of that same software application (much less a different software application in the same category) running a User Input Model.

In particular, it is important to note that benchmarks are designed as generic representative input models for a specific software application or category, whereas actual User Input Models often vary significantly from one another with respect to the manner in which they perform their tasks. For example, a software application typically includes a variety of features, each using different algorithms directed at different types of problems. Therefore, different users might take different approaches in designing their User Input Models, and the designer of a benchmark cannot implement an approach that is representative of the approaches taken by all of those users. It is therefore not surprising that the performance (e.g., duration and cost) of a benchmark run (on a benchmark designed as a generic substitute for these widely varying types of User Models) may not correlate with the performance of various jobs in which the same software runs different User input Models.

Moreover, the scale of a User Input Model may be significantly larger or smaller than the scale of a benchmark for the same software application. The User Input Model may involve an extensive number of calculations on a relatively large number of elements or cells of various objects being modeled. Conversely, the User Input Model may involve very few calculations on a relatively small number of cells of an object being modeled. In either case, the scale of the job running the User Input Model may have little or no correlation to the scale of the benchmark (e.g., the number of calculations the benchmark performs to distinguish the performance of different core types).

Moreover, benchmarks and User Input Models may each utilize computing resources in a very different manner, even as inputs to the same software application. Due to differences in their underlying algorithms and scale, each may well experience different types of bottlenecks (e.g., relating to their utilization of CPU, memory, disk storage, network and other computing resources).

For example, some User Input Models utilize CPU speed very efficiently, and are often bottlenecked at lower core counts, while others may be bottlenecked by network bandwidth (for inter-node communication), by memory or disk storage bandwidth, or by characteristics of other computing resources. Here too there is little correlation to the manner in which the same software application running a benchmark utilizes the same computing resources (given that the benchmark is designed as a generic substitute for an array of User Input Models which implement very different algorithms from one another).

For example, while a series of benchmark runs across different core type/count combinations may suggest that a particular core type/count will yield the shortest duration, a job in which the same software application runs a User Input Model on that same core type/count may run significantly slower than expected—e.g., due to a memory bandwidth bottleneck not "revealed" by that benchmark. This lack of correlation in the use of computing resources could result from various factors, such as a difference in scale between the benchmark and the User Input Model, or a difference in the types of calculations performed and the manner in which they utilize memory.

Given the limitations of benchmarks in predicting the duration of a job running a User Input Model across different compute infrastructure, it follows that the cost of a benchmark run also is not a reliable indicator of the overall cost of a job running a User Input Model. Moreover, a benchmark corresponding to a user's chosen software application may not even exist, forcing the user to select an even less reliable substitute, such as a benchmark designed for a different software application in the same general category. There are simply too many potential differences between the performance of a job running a benchmark and one running a User Input Model for a benchmark to be a reliable and accurate substitute for a User Input Model.

Moreover, each particular core type itself tends to utilize certain computing resources in a particular manner, even across different software applications and associated benchmarks. For example, certain core types tend to achieve greater CPU speeds (e.g., due to higher clock-speed CPUs) while others may excel in memory or disk storage bandwidth (e.g., due to higher-speed memory or disk storage hardware) or in network bandwidth (e.g., due to low-latency network hardware). These "core type performance metrics" are thus indicative of the manner in which a core type utilizes computing resources, apart from the influence of particular software applications and associated benchmarks.

Yet, benchmarks do appear to be a "necessary evil," even if they are not sufficiently predictive of the prospective performance of jobs running User Input Models. Given the vast array of different core type/count combinations (not to mention CSPs' frequent introduction of new core types), it is simply impractical for a user to run simulations of its proprietary User Input Model across even a significant subset of available core type/count combinations.

There is thus a need to discern from "benchmark performance metrics" how a job running a particular User Input Model is likely to utilize available computing resources. As is demonstrated below, the present invention provides solutions to these shortcomings by relying on more than benchmark duration and the relative cost of different core types, and focusing on correlating benchmarks with User Input Models with respect to the manner in which software applications running each of them utilizes computing resources.

In addition to determining and managing the hardware environment, HPC users also must obtain the rights to execute particular software in a remote cloud environment. And they must install and configure the software for each job, as well as match the demands of a particular job (and the relevant software) with the appropriate amount of compatible hardware computing resources.

They must develop their own tools to implement custom workflows, as well as test or "tune" the software and hardware in advance of executing HPC jobs that are often complex, time-consuming and expensive. In short, they must manage all of the dependencies of each job on the provisioned hardware and software environment—including sharing data across clusters and physical servers, managing inter-cluster and inter-server communication, providing data security and privacy issues beyond those offered by back-end hardware providers, maintaining a compliant HPC environment in accordance with contractual, regulatory and other legal requirements, and many other aspects of complex HPC jobs.

Moreover, each ISV provides its own software license restrictions, typically by enforcing authentication and license management via third-party "license servers." Each ISV may impose different restrictions on the location of, and access to, its license server. Here too, HPC users are responsible for obtaining the rights and providing interfaces to each relevant license server (wherever such license servers may be physically located).

While back-end hardware providers "meter" the usage of provisioned clusters (or other units of hardware resources), HPC users must implement their own custom "per job" metering if they desire to monitor the cost of such IaaS resources on a per-job or other basis (at a higher or lower level of granularity). Moreover, if they desire to meter the usage of software (e.g., to gauge relative licensing costs), they must provide their own custom metering implementation.

In an effort to address some of these problems, a few vertical solutions have emerged, offering more of a "software-as-a-service" or SaaS solution than the IaaS solution offered by public and private cloud providers. For example, in addition to providing IaaS features, some large ISVs have integrated their own software with a back-end public cloud, or with their own hardware infrastructure. Such "ISV Clouds" offer users of their software a remote hardware platform for running HPC tasks.

However, users of such ISV Clouds are limited to a single software provider, a significant limitation that eliminates users who require a more diverse selection of software. Moreover, users still must address many of the dependencies discussed above with respect to software and hardware tuning and workflows, as well as the need to provide, install, configure and manage their own proprietary or third-party software—if even allowed by the ISV Cloud provider.

Other vertical solutions provide their own IaaS environments (whether directly or via a single third-party cloud provider), but with access to certain third-party software packages. These "HW Clouds" also suffer from many of the same limitations discussed above. While providing end users with a choice of software, their solutions are limited to the computing resources provided by a single back-end hardware environment. Such a significant limitation prevents users, for example, from taking advantage of more powerful servers available only from bare-metal providers, or more cost-effective solutions offered by other cloud providers.

What is needed is an integrated compute platform that addresses the shortcomings of existing solutions described above, and offers true "platform-as-a-service" (PaaS) functionality by providing HPC users with a remote platform that enables them to select from multiple back-end hardware providers and multiple ISVs while automatically resolving the interdependencies among those hardware and software environments, including those relating to determining which compute infrastructure optimizes their performance goals (as a function of cost, duration and/or other related factors). Such an integrated compute platform should also address the dependencies of software and other attributes of HPC jobs on the selected hardware environment.

SUMMARY

The present invention includes embodiments of systems and methods for addressing the deficiencies noted above by providing a cloud-based compute platform that employs abstraction layers for communicating with and integrating the resources of multiple back-end hardware providers, multiple software providers and multiple license servers. These abstraction layers and associated functionality free users not only from having to implement and configure provider-specific protocols, but also from having to address interdependencies among selected hardware, software and license servers on a job-level basis or at other levels of granularity.

The platform of the present invention automatically selects computing resources among hardware, software and license servers from among multiple providers (including on-premise customer resources) in accordance with higher-level user selections based on the demands of individual jobs and workflows. With respect to a given job defined by a user, the platform automatically interfaces with one or more back-end hardware providers to provision computing resources.

In one embodiment, an HPC user requests core types from specific back-end hardware providers, while in other embodiments the user's higher-level computing resource selections are translated into lower-level requests to one or more back-end hardware providers selected by the platform to optimize for the user's predefined goals (e.g., cost, execution time, particular computing resources, etc.). In other embodiments, the platform generates suggested computing resource selections automatically based upon an analysis of the user's needs, evidenced from the user's model and other input parameters.

In one embodiment, back-end hardware providers include multiple public cloud providers and private data centers, as well as computing resources located on an HPC user's own premises—all accessible via different APIs implemented within the platform's back-end hardware abstraction layer. For example, an HPC user's job might be executed on servers within a public cloud provider using networked storage located on the user's premises. Or the user's servers might be supplemented with the additional computing power of those offered by a cloud provider.

This integration of particular computing resources across multiple back-end hardware providers (including an HPC user's on-premise computing resources) offers an unparalleled level of flexibility not previously found in any HPC environment. HPC users need not be concerned with inter-provider communication and, for example, the transfer of data among computing resources in different hardware environments, as such tasks are handled automatically by the platform.

The platform also automatically installs and configures the selected software in the provisioned hardware environment (in some cases, across multiple different hardware providers) in accordance with the user's specified configuration and input data. The platform further establishes connections with relevant license servers via associated license files (including license keys) that govern a user's access to and usage of associated software and its components.

The platform provides users with workflow tools to facilitate not only the configuration of a single HPC task (e.g., executing a single simulation software package on a user's model), but also the configuration of more complex jobs involving multiple tasks performed serially or in parallel. For example, the output of one or more tasks might be provided as input to subsequent tasks or jobs, or individual tasks or jobs may be repeated with different parameters. Workflows include loops, conditions and other control flow computing constructs.

Moreover, users are provided with hardware and software "tuning" tools that enable users to test specific portions of a job or single task and, based on the results, reconfigure the computing resources and other attributes of the hardware and software environment before incurring the time and expense of executing a complex job or workflow. Because many jobs require the use of significant amounts of computing resources over many hours (or sometimes days, weeks or longer), the ability to test key portions of jobs in advance (particularly those portions that are repeated many times), and then iteratively revise initial hardware and software configurations, saves the user significant time and expense—both in advance of and during the actual execution of a complex workflow.

In one embodiment, the platform recommends hardware computing resource and/or software configuration options based on the results of hardware and software tuning in an effort to best match the available computing resources with the demands of an HPC user's job or workflow. Such demands are inferred from an analysis of the user's model, input data and intermediate results of tuning "test runs."

In one embodiment, while a user's workflow is being executed, the platform (in accordance with the user's workflow configuration) monitors intermediate results and initiates certain actions, such as repeating or conditionally performing selected tasks, or even halting the execution of the workflow (e.g., to prevent wasted computation in the event of a catastrophic error detected based on such intermediate results). In other embodiments, the platform (in accordance with an HPC user's workflow, including conditions, loops and other flow control constructs) invokes analytic software to perform analyses of intermediate as well as final results. In another embodiment, the platform discovers patterns among outputs of similar jobs and workflows (e.g., via supervised machine learning techniques), which it uses to support various recommendations, such as different allocations of hardware or software computing resources.

In yet another embodiment, discussed in greater detail below, the platform relies on benchmarks to generate a "Compute Infrastructure Performance Database" of benchmark performance metrics reflecting how different software applications utilize computing resources when running associated benchmarks across various available compute infrastructure options (e.g., core types and core counts). As discussed below, the Compute Infrastructure Performance Database also includes core type performance metrics reflecting the performance of core types independent of a particular benchmark or software application.

These metrics serve as input to a "Recommendation Engine." The Recommendation Engine also takes as input a set of "user performance metrics" which reflect how the user's selected software application utilizes computing resources when running the User Input Model (rather than running benchmarks). The Recommendation Engine generates an ordered list of recommended compute infrastructure, including a recommended core type and core count, for use by the user in running subsequent jobs.

As will be explained below, the Recommendation Engine essentially relies on these benchmark, user and core type performance metrics to (i) analyze the manner in which a user's selected software application utilizes computing resources when running the user's proprietary User Input Model, and (ii) generate a recommendation of compute infrastructure (e.g., core type and core count) that will elicit similar behavior (e.g., be bottlenecked in a similar manner) while satisfying specified User Goals.

A "Compute Performance Generator" is employed, with respect to each benchmark run, to generate a set of items and store them in the Compute Infrastructure Performance Database. In one embodiment, each set of items includes "Inputs" associated with that benchmark run, including the selected software application (and its category), the selected benchmark associated with that software application, the selected core type on which the software application runs that benchmark (as well as the number of cores per node associated with that core type), and the selected core count (i.e., number of cores) employed during that benchmark run. Subsequent benchmark runs vary the core count (for each available core count of that core type) as well as the core type itself. Additional sets of benchmarks runs are performed with other benchmarks (including those associated with the same software application) as well as other software applications (including those in other software categories).

In addition to storing Inputs, the Compute Performance Generator also performs a set of "Measurements" from each benchmark run, which also are stored in the Compute Infrastructure Performance Database as part of the set of items associated with that benchmark run. In one embodiment, these Measurements include the duration of the benchmark run as well as, in another embodiment, the cost of that benchmark run (based, for example, on the per-core-hour price charged by a CSP for the particular core type).

Another key Measurement includes a "Hardware Signature" reflecting the manner in which the software application utilizes computing resources during each benchmark run. In one embodiment, the Hardware Signature includes a set of "Hardware Profiles," each of which is associated with a particular hardware resource. For example, one Hardware Profile reflects the percentage of CPU utilization over time during that benchmark run. Others reflect utilization of memory, disk storage, networking and other computing resources. In another embodiment, multiple different Hardware Profiles are measured with respect to different aspects of the same hardware resource (e.g., CPU usage for calculations v. CPU usage for I/O operations). The Hardware Profiles measured from a benchmark run are collectively referred to as a Hardware Signature.

In one embodiment alluded to above, the Compute Performance Generator performs a set of "Core Type Performance" measurements of the performance of individual computing resources by each core type—but not with respect to any particular benchmark or even any particular software application or category. In this embodiment, the Compute Performance Generator runs a special program or "microbenchmark" on a single node of each core type (or multiple nodes where network-related resources are involved, and measures the relative performance (across core types) of each computing resource. The result is a set of core type performance metrics specific to each core type (independent of benchmarks and software applications).

In addition to Inputs and Measurements, the Compute Performance Generator performs various "Calculations" to facilitate the recommendation of compute infrastructure options by the Recommendation Engine. As will be explained in greater detail below, the Compute Performance Generator utilizes the core type performance metrics to calculate an ordered set of "Prioritized Bottlenecks" specific to each benchmark (i.e., based on the correlation of the core type performance metrics to corresponding RPI values). For example, with respect to a particular benchmark, the Prioritized Bottlenecks might include a memory bandwidth bottleneck (most significant) followed by a CPU utilization bottleneck and a network bandwidth bottleneck. In another embodiment, bottlenecks of one or more computing resources may be excluded due to their failure to exceed a predefined threshold of "bottleneck significance").

In another embodiment, each of the Prioritized Bottlenecks is weighted by its significance as a bottleneck with respect to a particular benchmark. For example, a memory bandwidth bottleneck might have a weighting of 80%, indicating a highly significant bottleneck when running the benchmark, while a CPU utilization bottleneck might have a less significant 50% weighting. These weighted bottlenecks are used by the Recommendation Engine, as discussed below, to generate an ordered set of core type recommendations.

In one embodiment, two other Calculations are performed by the Compute Performance Generator. One is referred to as the "Rescale Performance Index" (or "RPI"). RPI values are normalized values that reflect the performance of core types (relative to a "baseline" core type) with respect to the duration of benchmark runs across benchmarks and software applications.

In this embodiment, one core type is designated as the baseline core type with an RPI value of 1.0. The Compute Performance Generator calculates normalized RPI values with respect to benchmark runs on the other core types (even across benchmarks and software applications). Benchmark runs on core types having shorter durations (relative to the duration of the baseline core type) will have higher RPI values (i.e., better performance than the baseline core type), while benchmark runs on core types having longer relative durations will have lower RPI values (i.e., worse performance than the baseline core type).

As will be explained in greater detail below, the Recommendation Engine employs RPI values to compare the performance of core types with respect to a particular software application chosen by a user. In one embodiment, the Recommendation Engine makes a tentative initial recommendation of a core type on which the user will run a job invoking its selected software application to run its User Input Model for the purpose of generating a Hardware Signature (i.e., user performance metrics since the software application ran the User Input Model rather than a benchmark).

The Recommendation Engine employs that generated Hardware Signature to recommend an ordered set of core types from the Compute Infrastructure Performance Database based on Prioritized Bottleneck values generated with respect to multiple benchmarks associated with that software application. As a result, the Recommendation Engine generates more precise recommendations based on the utilization of computing resources when the user's chosen software application runs the User Input Model rather than a benchmark. As noted above, this avoids the problem of relying solely on a benchmark as a substitute for the User Input Model.

Another Calculation performed by the Compute Performance Generator is referred to as the "Rescale Scaling Score" (or "RSS"). Whereas RPI values are employed by the Recommendation Engine to facilitate core type recommendations, RSS values are employed by the Recommendation Engine to facilitate core count recommendations for recommended core types.

As will be explained in greater detail below, RSS values reflect the scalability of a core type across its available core counts with respect to benchmark runs involving a specific software application running a particular benchmark. In other words, when a software application runs a particular benchmark on multiple different core counts of a core type, one might expect that doubling the core count will result in halving the duration (i.e., perfect scaling). But this is often not the case—e.g., due to bottlenecks that limit the expected performance (such as a memory bandwidth bottleneck that limits the advantage of a higher-speed CPU). By analyzing the relative performance of a software application on a core type as core counts are increased, the Compute Performance Generator quantifies the relative scalability of each increase (e.g., a value of 1.0 representing perfect scaling from 2 cores to 4 cores, but a value of 0.8 representing only relatively good scaling from 4 cores to 8 cores).

The manner in which the Recommendation Engine uses RSS values to facilitate its recommendation of particular core counts (e.g., on a recommended core type) is discussed in greater detail below. As is the case with core type recommendations, the Recommendation Engine relies not merely on data from benchmark runs, but also on data from jobs in which the user's chosen software application runs User Input Models, providing more accurate and reliable insight into how computing resources are utilized when User Input Models, not merely benchmarks, are involved.

Once the Compute Performance Generator generates the Input, Measured and Calculated values stored in the Compute Infrastructure Performance Database, the Recommendation Engine employs these values, along with Hardware Signatures generated by having a user's chosen software application run its User Input Model on a core type and core count determined based on RPI values from the Compute Infrastructure Performance Database. In one embodiment (discussed in greater detail below), the Recommendation Engine employs machine learning classifiers to generate recommended core types and core counts based on the Hardware Signature generated for the user.

In effect, the machine learning classifiers employ the generated Hardware Signature to classify bottlenecks from benchmark runs into those exhibiting similar "bottlenecked behavior" to the behavior of the user's chosen software application when running the user's User Input Model. In one embodiment, the Recommendation Engine maps such ordered and weighted bottleneck values to the highest performing core types based on the core type performance metrics stored in the Compute Infrastructure Performance Database, resulting in an ordered set of core type recommendations.

As explained in greater detail below, the classifiers also classify RSS values to facilitate identification of core counts on recommended core types that represent highest scaling efficiency. The classifiers are trained on training samples from benchmark runs previously generated by the Compute Performance Generator and stored in the Compute Infrastructure Performance Database.

In another embodiment, a "User Goal Optimization Manager" refines these recommendations by taking into account a user's specific User Goals, such as lowest cost, shortest duration or some combination of these and other related factors. In yet another embodiment, users define a User Goal "optimization function" of these various factors that represents the user's goals with greater precision.

In still another embodiment, upon detecting a pattern of similar recommendations over the course of multiple jobs run by a user, the Recommendation Engine automatically generates an ordered set of recommended core types and core counts without relying on the machine learning classifiers. In essence, once the manner in which a software application utilizes computing resources when running a user's User Input Model has been determined (i.e., with respect to the degree to which such jobs are bottlenecked by particular computing resources), the core type and core count that best satisfies that user's User Goals can be determined more directly.

Details of the Recommendation Engine, and the process by which the present invention recommends core type, core count and related compute infrastructure, are discussed below with respect to FIGS. 3-5.

The platform also enforces license server restrictions based on a license file provided by the user or generated by the platform. For example, a license file might limit a user's access to specified features of a software package. The platform connects to the relevant license server, via a license server abstraction layer, which enforces such restrictions.

The platform further includes a hardware and software metering module that monitors the execution of a user's workflow on the provisioned hardware environment. In one embodiment, such monitoring occurs at the granularity of an individual task, as well as a more complex job or workflow. Moreover, because a workflow (or component job or task) may be executed across multiple back-end hardware providers, such monitoring tracks specified components of a user's workflow, each of which may be metered differently by different back-end hardware providers. Such metering even extends, in one embodiment, to an HPC user's on-premise hardware, which typically has no metering capability itself.

While an individual back-end hardware provider may not distinguish one user's workflow or job from another, the platform tracks (in one embodiment) the utilization of individual hardware resources (e.g., CPU cores, memory, storage, network bandwidth, etc.) for the purpose of monitoring usage of each resource associated with a user's workflow (or component jobs or tasks). Such usage is later correlated with various pricing schemes (e.g., established by different public cloud providers) to calculate fees and facilitate billing to users, their enterprises, partners or other entities.

It should be noted that the "customer" of a back-end hardware provider may be the provider of the platform of the present invention, or may (in other embodiments) be a third-party partner, an ISV or even an individual HPC user or enterprise. For example, a company might select its own cloud account for execution of its users' workflows (or components thereof), or the public or private cloud account of a third-party partner of the platform provider. In any event, by monitoring the execution of workflow components across multiple back-end hardware providers, the platform tracks hardware usage at a level of granularity sufficient to support virtually any desired pricing and billing mechanism.

The hardware and software metering module also supports monitoring an HPC user's usage of individual software packages or components thereof (at a workflow or job level, or virtually any other level of granularity). Such metering is facilitated by management of the connectivity to remote license servers, access to which is monitored by the platform. Such monitoring functionality extends beyond mere "checkout" and "checkin" events, and is also used as a basis of on-demand metering and pricing of software usage.

In another embodiment, such monitored usage information is employed as a basis for optimizing an HPC user's goals. For example, while faster hardware may generally be more expensive, slower hardware may result in increased software licensing costs. The platform optimizes for the HPC user's specified goal and makes recommendations for future jobs or workflows (or in advance in the case of hardware and software tuning "test runs"). One embodiment of this recommendation process is discussed in greater detail below with respect to FIGS. 3-5. In yet another embodiment, result-based pricing is supported by virtue of the fact that the platform monitors not only the usage of particular software (or component features), but also user-specified results.

It should be noted that, even if a user's workflow involves only the execution of a single software package on the hardware environment of a single back-end hardware provider, the software execution time may be only a subset of the hardware execution time. For example, a back-end hardware provider may charge for hardware usage from the moment a cluster of hardware is provisioned (until it is de-provisioned), even though only some of that time involves actual execution of the software. Additional "hardware usage" time may be required to configure and launch instances of the software, and to extract the results.

For more complex workflows, "software usage" time is allocated across multiple clusters or physical servers, multiple back-end hardware providers and multiple software packages (and component features thereof). Here too, the hardware and software metering module of the platform monitors such "software usage" at desired levels of granularity sufficient to support virtually any desired pricing and billing mechanism.

In another embodiment (discussed in greater detail in U.S. patent application Ser. No. 15/235,004, filed Aug. 11, 2016 and entitled "Dynamic Optimization of Simulation Resources," the disclosure of which is incorporated by reference herein), the platform also monitors the use of computing resources during the execution of a job or workflow, and provides a mechanism for dynamically optimizing such resources to address inter-instance dependencies.

The platform further includes a billing layer and associated functionality, in conjunction with the hardware and software metering module, to facilitate the platform's support of various different pricing schemes and detailed usage allocations for invoicing multiple different entities (individuals, HPC enterprises, ISVs, third-party partners, etc.). In one embodiment, the platform supports the calculation of fees based not only on metered usage or consumption-based on-demand pricing, but also on results-based, advance deposit, subscription, per-seat, concurrent user and other pricing models adopted by various provider entities.

Given the enhanced importance of data privacy and security issues when remotely executing HPC jobs and workflows in cloud-based environments, the platform provides an additional layer of data privacy and security by encrypting data (at provision, de-provision and compute-time) uniformly across multiple different back-end hardware environments. Such encryption further enhances (and is fully compatible with) whatever level of security is provided by different back-end hardware providers. The platform further includes a uniform "data management" interface that accounts for the different data structures and protocols employed by different back-end hardware providers.

In comparison with existing solutions, the advantages of the platform of the present invention are numerous. HPC users and enterprises are provided enhanced flexibility to match the demands of their jobs and workflows with the computing resources offered by multiple back-end hardware providers and multiple software providers. Yet, they retain the flexibility to leverage their existing on-premise computing environment (including "bring-your-own" or BYOL licenses and proprietary software, as well as on-premise compute and storage resources).

Moreover, the platform frees HPC users from integrating and configuring selected hardware and software (including license servers), even to the extent they "mix and match" different computing resources across multiple hardware and software providers (including on-premise hardware and software resources). Even within the context of a single back-end hardware provider, HPC users need not be concerned with the provisioning and de-provisioning of clusters of individual "virtual machines" (VMs), and the launching of instances of software across such VMs.

HPC users are provided with workflow and hardware and software tuning tools that not only provide enhanced flexibility in defining a complex workflow, but also minimize the resulting time and expense (or other optimized factors) of executing such workflows. Hardware and software metering provide convenient mechanisms for efficiently managing the time and expense of executing HPC workflows and jobs, as well as supporting a variety of current and future pricing, licensing and billing schemes. Moreover, they further enhance the flexibility and robustness of individual HPC workflows and jobs, by permitting the performance of conditional results-based actions (for execution as well as pricing purposes) both during and after execution of an HPC workflow or job.

In short, the integrated platform of the present invention frees HPC users not only from the constraints of limited hardware and software (and license server) choices, but also from the need to resolve the interdependencies that result from such multi-provider integration (including hardware and software compatibility issues, software installation and job and workflow configuration, license management, different licensing and pricing mechanisms, data security and privacy, etc.).

Additional aspects and embodiments of the platform of the present invention are described in greater detail below.

BRIEF DESCRIPTION OF DRAWINGS

FIG. 3 is a table illustrating key types of data generated and stored in one embodiment of a Compute Infrastructure Performance Database component of a Recommendation Engine component of a multi-provider server of the cloud-based platform of the present invention.

DETAILED DESCRIPTION

Detailed embodiments of the systems and methods of the present invention are illustrated in the accompanying Figures and described below. It should be noted that the present invention is not limited to the particular embodiments discussed below with reference to the Figures. For example, the present invention could be integrated into distinct server platforms with the functionality reallocated among fewer or more different conceptual modules (implemented in hardware and/or software, and allocated among server and client devices), reflecting different engineering tradeoffs, without departing from the spirit of the present invention. Additional embodiments of the systems and methods of the present invention (including additional standard and proprietary hardware and software) will be apparent to those skilled in the art.

The software components of the present invention illustrated in the following Figures are embodied in physical memory and processed by CPUs (single and/or multi-core) on physical servers (not explicitly shown) to implement the functionality of the present invention. Such physical servers and such memory may be located in public or private clouds, end-user premises or other computing environments (together with or apart from the software implementing users' HPC workflows and jobs) without departing from the spirit of the present invention. In one embodiment, HPC users access the platform of the present invention over the Internet via standard web browsers on their client devices (servers, desktops, laptops, mobile phones and other networked devices).

Figure 1:
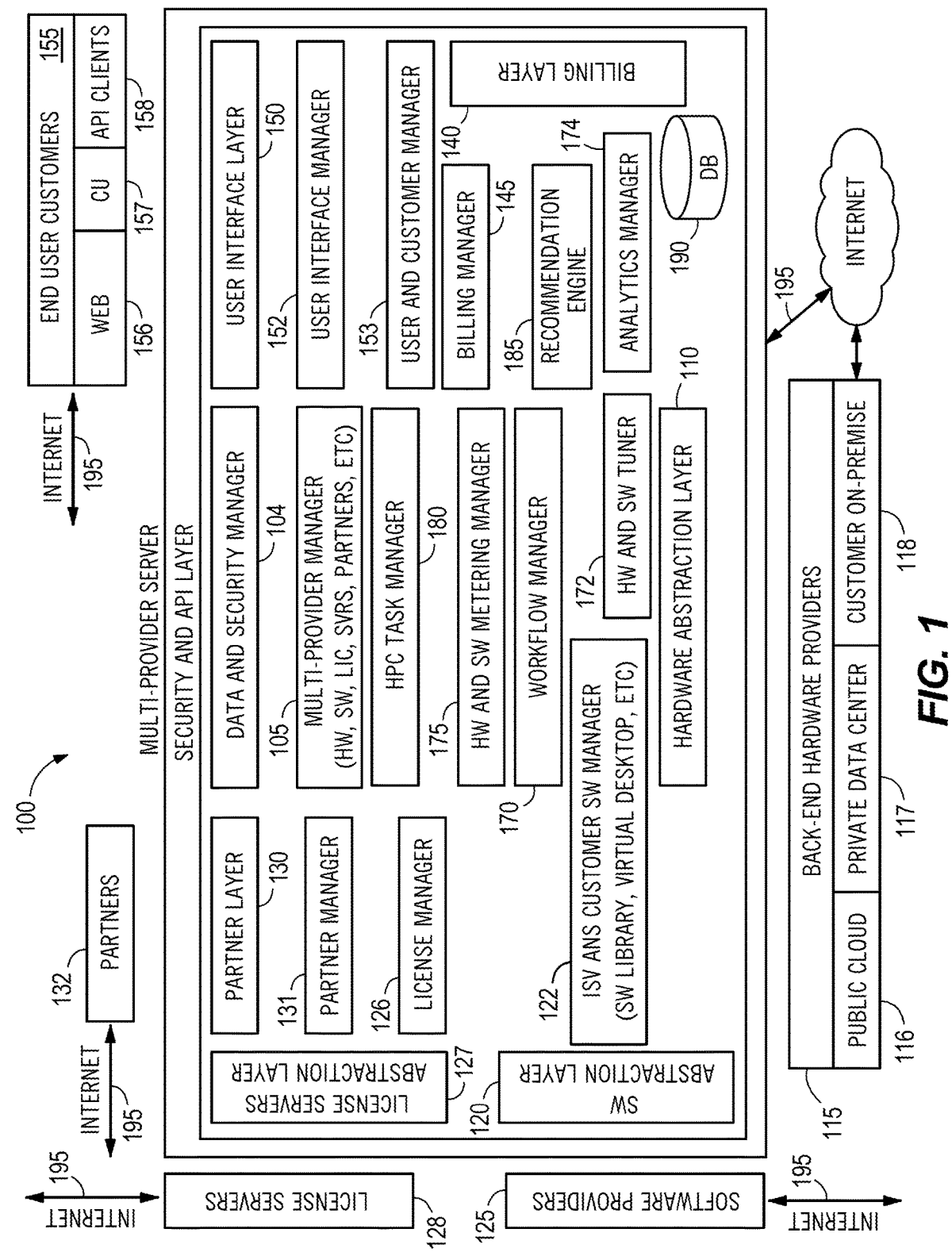
FIG. 1 is a system diagram illustrating one embodiment of key components of a multi-provider server of the cloud-based platform of the present invention.

Turning to FIG. 1, system diagram 100 illustrates one embodiment of a cloud-based platform of the present invention that is implemented by a Multi-Provider Server 101. We refer to the cloud-based "platform" interchangeably with the Multi-Provider Server 101, in that the functionality of the platform is implemented by Multi-Provider Server 101, which integrates functionality and resources from various other entities, all of which are interconnected via the Internet 195. HPC end-user customers 155 access Multi-Provider Server 101 over the Internet 195 via one or more different interfaces.

Most common is a web-based interface 156 that enables HPC users 155 to access the platform remotely (from their networked desktop and mobile client devices located virtually anywhere in the world) to generate and execute HPC workflows. Web-based interface 156 provides the most user-friendly interface for the generation and execution of workflows, as well as the viewing of results. Advanced HPC users 155 can also perform much of this functionality via a command-line interface (CLI) 157—akin to the use of "terminal" command-line interfaces (rather than the standard GUI interface) on desktop computers.

In certain situations, HPC users 155 employ API clients 158 to access the platform, enabling them, for example, to integrate their own custom software with the invocation of HPC workflows and jobs. Multi-Provider Server 101 implements various APIs, included within a Security and API layer 102, to facilitate such access to the platform.

In one embodiment, an HPC user 155 desires to utilize its own on-premise hardware and software environment in a manner that is otherwise independent of the platform. However, for certain relatively demanding jobs, the HPC user 155 desires a "burst" capability that enables on-demand use of additional computing resources available from Back-End Hardware Providers 115 integrated with the platform. In such scenarios, particular APIs in Security and API layer 102 (discussed below) permit a custom script running on the HPC user's 155 on-premise environment to invoke a predefined workflow or job on the platform that supplements the HPC user's 155 on-premise job and returns the results to the HPC user 155.

In this embodiment, the APIs facilitate the exchange of data (including job configuration, input data, intermediate data if the job is in progress, and results) between the HPC user 155 and the platform. As a result, the HPC user 155 can simply click a button on the platform's website, causing a job to run entirely on the platform (including installation and configuration of the relevant software), or partially on the user's laptop (for example), with "burst" capability to continue on the platform when additional computing resources are required.

User interface layer 150 facilitates the two-way communication between the platform and the various different interfaces provided to HPC users 155. User Interface Manager 152 generates the various different user interfaces presented to HPC users 155. In one embodiment, such interfaces include a web-based form enabling an HPC user 155 to select software from an available library, as well as hardware computing resource options. Another web-based forms enables the HPC user 155 to input their model, software configuration and input data specific to a workflow or job. Additional user interfaces include workflow tools for combining individual HPC tasks and implementing loops, conditions and other control flow constructs to control the execution of the workflow (as well as hardware and software tuning tools to test portions of a workflow or job, and reconfigure hardware and software resources, before initiating execution of the "full" workflow).

User and Customer Manager 153 generates and maintains a database of user entities, including individual HPC users 155 and their company affiliation (and user-specific access control and other limitations). This "user database" is maintained in DB 190. Storage of this user data, as well as other data utilized by Multi-Provider Server 101 can of course be distributed across other storage devices in various different locations without departing from the spirit of the present invention. In the embodiment illustrated in FIG. 1, DB 190 is also employed to store information specific to various other entities, such as third-party partners and providers of back-end hardware, software and license servers.

In this embodiment, the functionality of Multi-Provider Server 101 (including DB 190) resides on the virtual and physical computing resources of one or more of the Back-End Hardware Providers 115. The owner/operator of the platform administers the platform's functionality remotely from client devices on its own premises (not shown).

Security and API layer 102 includes a security mechanism (implemented via Data and Security Manager 104) that encrypts data at provision, de-provision and compute-time to ensure a uniform level of data privacy and security that complements whatever security is provided by other entities accessing the platform. The platform employs APIs within Security and API layer 102 for a variety of different purposes, depending upon the type of entity being accessed, as is discussed in greater detail below.

Data and Security Manager 104 also implements uniform data structures that are employed internally, and then translated for communication to various entities. For example, even public cloud providers 116 have different data structures and APIs for storing and retrieving data (analogous to different file systems on desktop computers). To move data back and forth among different Back-End Hardware Providers 115, the platform must translate to and from its universal format and communicate with the different APIs of these Back-End Hardware Providers 115.

Moreover, software often assumes that storage is "local," requiring the platform to abstract the actual physical (or virtual) locations of the data when configuring the software for a particular workflow or job. In one embodiment, if performance is significantly affected by the location of the storage, the platform performs translations before and after a job is executed to ensure that, during execution, local storage (i.e., where the job is executed) is maintained for performance reasons.

By handling inter-node (e.g., inter-VM) communication, as well as communication across multiple different Back-End Hardware Providers 115, at a job level, the platform frees users from having to address such dependencies. Moreover, a public cloud provider 116 meters usage at a VM or physical server level, whereas an individual job or workflow may involve multiple VMs or physical servers. In one embodiment, if one of the VMs experiences a hardware failure, the platform saves the job state, re-provisions another VM and restarts the job to avoid a more significant failure. In many cases, the software may effectively be "unaware" of the pausing/restarting of the job.

In another embodiment, the platform performs pre-job diagnostics (e.g., CPU, disk performance and network latency tests) to assess the "robustness" of the hardware environment and minimize the risk of having to halt execution of a job. In other embodiments, additional resources are allocated to provide a level of redundancy for similar reasons.

Multi-Provider Manager 105 provides additional functionality to manage the overall relationships and communications with various different types of provider entities (including HPC users 155, Partners 132, Back-End Hardware Providers 115, Software Providers 125 and providers of License Servers 128). Multi-Provider Manager 105 communicates internally with various platform modules that manage direct communications with such entities.

In one embodiment, the owner/operator of the platform contracts with various third-party Partners 132 to manage certain aspects of its relationship with HPC users 155. For example, a Partner 132 may be responsible for soliciting individuals and enterprises to become HPC users 155, and for managing the contractual and billing relationships with those solicited HPC users 155, as well as facilitating the integration of on-premise computing resources of those solicited HPC users 155 with the platform. Partners 132 may also effectively serve as Back-End Hardware Providers 115 and provide their own hardware infrastructure, or employ that of a public 116 or private 117 cloud provider for the benefit of their solicited HPC users 155.

Partner Layer 130 implements communications between the platform and individual Partners 132, involving translations of various different data structures, protocols and APIs. Partner Manager 131 implements such translations and interfaces with various platform components, such as Billing Layer 140, which is responsible for exchanging fees, invoices and related reports with Partners 132, HPC users 155, Back-End Hardware Providers 115 and Software Providers 125, among other entities. Billing Manager 145 implements such fee calculations, generates invoices and related reports and manages payments (interfacing with Multi-Provider Manager 105 and Hardware and Software Metering Manager 180, as well as other internal platform components).

Among the most significant entities integrated with the platform are Back-End Hardware Providers 115. As alluded to above, the workflows and jobs of HPC users 155 are not executed directly by Multi-Provider Server 101. Instead the platform integrates with the computing resources provided by multiple different hardware providers, including public cloud providers 116, private data center providers 117 and the on-premise computing resources 118 provided by HPC users 155.

As explained in greater detail below, the platform permits an HPC user 155 to select computing resources from one or more of the available Back-End Hardware Providers 115 (even for an individual workflow or job). In one embodiment, those choices are filtered by the attributes of the particular workflow or job designed by the HPC user 155. For example, if a particular software package is unavailable on the hardware environment of a particular Back-End Hardware Provider 115, then the computing resource options provided by that Back-End Hardware Provider 115 will be absent from the user interface seen by the HPC user 155. In another embodiment, the lack of such options will not be apparent in the user interface (e.g., in a list of higher-level computing resource options), but such incompatible options will not be chosen internally by Multi-Provider Server 101.

Access to the different computing resource environments of the Back-End Hardware Providers 115 is managed by Hardware Abstraction Layer 110, which translates internally-generated uniform formulations of computing resources into the specific core types, physical servers or other options offered by individual Back-End Hardware Providers 115. In one embodiment, the platform (with the assistance of Multi-Provider Manager 105) analyzes the higher-level requirements of the workflow or job specified by an HPC user 155, such as a need for 100 CPU cores. Such higher-level requirements might be satisfied by different core types from two different Back-End Hardware Provider 115—one provider offering 10 nodes (servers), each having 10 CPU cores/node, and the other provider offering 20 nodes, each having 5 CPU cores/node.

If HPC user 155 specifies overall cost as the sole optimizing factor, the latter choice may be less expensive, as the cost of 10-core nodes may be more than double the cost of 5-core nodes. But, if the HPC user 155 instead desires to optimize for time (e.g., preferring a job that completes in 1 day instead of 3 days, even at a greater cost), the former choice may be preferred—e.g., because the inter-node communication overhead among 10 nodes (as opposed to 20 nodes) results in significantly faster overall job execution time. In one embodiment, the platform automatically makes this decision in accordance with the optimization factors specified by HPC user 155. In other embodiments, the platform presents detailed recommendations from which HPC user 155 makes the final decision. One embodiment of a "Recommendation Engine" 185 that manages this recommendation process is discussed in greater detail below with respect to FIGS. 3-5. It will be apparent to those skilled in the art that other tradeoffs of various different factors, and other implementations of this comparison among multiple different choices of hardware computing resources, may be considered in making this decision.

In another embodiment, the selected computing resources with respect to an HPC user's 155 individual workflow or job are implemented on the virtual and/or physical hardware environments of multiple Back-End Hardware Providers 115. In making this determination, the platform considers various factors, including the model, software and configuration and input data provided by HPC user 155, as well as optimization parameters (e.g., total calendar time, execution time, cost, etc.) specified by HPC user 155, as referenced above.

In addition to utilizing Hardware Abstraction Layer 110 to provision selected computing resources, the platform also employs Hardware Abstraction Layer 110 to manage the two-way communication with the Back-End Hardware Providers 115 for the purpose of monitoring execution of workflows (with respect to both hardware and software components), de-provisioning computing resources and performing various billing and other functions.

For example, while certain Back-End Hardware Providers 115 have their own "schedulers" for allocating computing resources to a job, the platform essentially provides a higher-level scheduler that is translated into the particular data structures, protocols and APIs required by each individual Back-End Hardware Provider 115 (including APIs for integrating on-premise computing resources without such scheduler functionality).

In addition to providing access to multiple Back-End Hardware Providers 115 (within and across HPC tasks, jobs and more complex workflows), the platform also provides HPC users 155 with a choice of multiple third-party software packages from multiple Software Providers 125. SW Abstraction Layer 120 manages the different APIs among the various Software Providers 125 integrate into the platform (e.g., for receiving software updates, exchanging invoices, usage reports and other billing and payment information, including electronic payments—with the assistance of Billing Manager 145 and Billing Layer 140).

ISV and Customer SW Manager 122 manages the platform's software library, a subset of which is made accessible to specified HPC users 155 based on the terms of their licenses to such third-party software (and its component features). ISV and Customer SW Manager 122 maintains distinct software "images" for each operating system on each Back-End Hardware Provider 115. In one embodiment, before a job is executed, the platform installs the relevant image so that it can be replicated as needed within the selected hardware environment. In this manner HPC users 155 are ensured in advance of the compatibility of the selected software with the specified hardware environment.

In another embodiment, the platform includes development and integration tools that enable HPC users 155 to develop and integrate proprietary software for their use during subsequent workflows and jobs. Such tools ensure compatibility with the available hardware environments and provide configuration tools to optimize for the best "HW-SW match" in accordance with the optimization factors specified by the HPC user 155. In yet another embodiment, the platform generates OS-independent "containers" to facilitate the installation of such software across different operating systems and Back-End Hardware Provider 115.

ISV and Customer SW Manager 122 also includes "virtual desktop" tools that facilitate analytics and other interactive GUI views during and after the execution of a workflow or job. Similar to "remote desktop" software in which applications are controlled locally, but execute remotely, virtual desktop functionality provides HPC users 155 with the ability to invoke and monitor certain aspects of their jobs during and after execution.

As noted above, different ISVs have different requirements for the location and use of their proprietary and third-party License Servers 128. License Server Abstraction Layer 127 provides significant flexibility in integrating with various different License Servers 128 (across multiple different ISVs) installed in virtually any physical location. For example, some ISVs may limit the location of the physical License Server 128 (e.g., to the ISV premises or the HPC user 155 premises), while others may permit the software implementing the license server functionality to be physically located anywhere—e.g., on a public cloud 116 (provided the ISV maintains sufficient control to ensure the integrity of the license server functionality).

License Manager 126 provides tools to ensure that the HPC user's license file on the relevant License Server 128 is accessible by the current job (e.g., for authentication and check-in and check-out purposes, as well as for ensuring that the terms of the license are strictly enforced)—regardless of its physical location. In certain cases, advance custom integration is required if the License Server 128 is located on the premises of an HPC user 155.

License Manager 126 works with HW and SW Metering Manager 180 to ensure that the terms of the license are strictly enforced. In one embodiment, HPC users 155 provide a "bring-your-own" (BYOL) license which the platform makes accessible via the relevant License Server 128 during the execution of a job. In another embodiment, the owner/operator of the platform also obtains advance authorization from the relevant ISVs to generate on-demand licenses (prepaid and otherwise) for this same purpose. In this scenario, if a BYOL license provided by an HPC user 155 fails (e.g., due to an outdated version or other reason), the platform can automatically redirect access to a platform-hosted License Server 128 to executed a job (or, in another embodiment, to provide on-demand "burst" capabilities in the event the HPC user 155 exceeded allotted usage requirements).

Due to this level of integration with the platform, HPC users 155 are freed from many of the constraints of existing BYOL (and even some on-demand) licensing schemes. The platform's level of integration with third-party License Servers 128 provides for two-way communication during execution of a job, and employs proxies to address firewall issues across various different Back-End Hardware Providers 115 (including on-premise firewalls at the HPC user's 155 physical location). By probing such License Servers 128 in advance, the platform avoids the costs of unnecessary hardware provisioning to HPC users 155 (e.g., in the event that the license authentication fails).

To assist HPC users 155 in setting up a workflow, Workflow Manager 170 provides tools that are insulated from the hardware and software compatibility issues with which HPC users 155 typically are forced to address. In other words, these workflow tools are at a higher level of abstraction, enabling HPC users 155 to focus on the functionality of their specific HPC tasks.

As alluded to above, Workflow Manager 170 includes templates and tools that enable HPC users 155 to implement loops, conditions and other control flow constructs both within and across individual HPC tasks and jobs (involving software packages from multiple Software Providers 125 executing across the hardware resources of multiple Back-End Hardware Providers 115). The output of one task can be redirected as input to subsequent tasks. Execution can branch to specified tasks based on intermediate results in accordance with specified constraints. For example, in the context of designing an airplane wing, a common repeated calculation or "sweep" involves varying the angle of the wing. The same calculation can be repeated in multiple test runs, varying only in the parameters used to define the angle of the wing.

Moreover, HW and SW Tuner 172 includes tools enabling HPC users 155 to design "test runs" to facilitate the selection of desired hardware resource and software configuration parameters. For example, an HPC user 155 can identify a relatively small portion of a job that is frequently repeated, and test that portion on multiple different hardware configurations. Once a desired configuration is determined, the desired hardware computing resources can be provisioned to execute the full job. In another embodiment, the HPC user 155 specifies conditions for the test runs which, if met, will automatically cause a reconfiguration and execution of the full job in the desired hardware environment. Such "hardware tuning" tools provide not only flexibility for testing purposes, but also provide cost savings by avoiding long expensive jobs that ultimately fail (or waste significant resources) due to a poor selection of hardware computing resources.

HW and SW Tuner 172 also includes "software tuning" tools that enable HPC users 155 to design test runs to measure the software-specific aspects of their workflows and jobs in an effort to identify the appropriate hardware computing resources. For example, HW and SW Tuner 172 enables HPC users 155 to test and compare the performance of different configurations (such as different implementations of a particular software driver) before selecting the desired configuration.

In other cases, more complex workflows can be developed based on intermediate results—e.g., repeating calculations until certain conditions are met, or invoking analytic software if other conditions are met. Moreover, partial or intermediate results may indicate that the hardware configuration needs to be altered—e.g., to include a GPU-only configuration, or to increase or decrease the number of provisioned VMs.

As noted above, HW and SW Tuner 172 also include optimization tools enabling HPC users 155 to specify optimization factors, such as job execution time and job cost, among others. Such tools provide automated means of discovering execution time and pricing "sweet spots" (e.g., balancing node costs, communication overhead, licensing restrictions and various other factors).

Analytics Manager 174 provides tools to customize the configuration of analytic software (e.g., included in the platform's software library) for use both during and after the execution of a job or more complex workflow. In one embodiment, such analytics software provides HPC users 155 with an interactive GUI-based tool that enable them not only to monitor intermediate results of a workflow, but also to affect those results by modifying certain parameters and visualize the effects of such modifications in real time.

Once an HPC user 155 has defined and configured a job or workflow, and tuned the hardware and software, HPC Task Manager 175 is employed to provision the specified computing resources on the selected hardware environment, install and configure the selected software and initiate execution of the workflow. HPC Task Manager 175 also monitors the execution of the workflow to obtain intermediate status (e.g., if a job or a portion thereof fails, such as a provisioned VM) and alert the HPC user 155 when the workflow completes or is prematurely terminated.

As noted above, HW and SW Metering Manager 180 monitors the usage of both hardware and software resources during execution of the workflow for a variety of different purposes. Monitored hardware and software usage data provides the basis for fee calculations—e.g., to invoice, provide reports and exchange payments with HPC users 155 and Partners 132, as well as Back-End Hardware Providers 115 and Software Providers 125. HW and SW Metering Manager 180 interacts with Billing Manager 145 and Billing Layer 140 in this regard.

Moreover, HW and SW Metering Manager 180 also works with License Manager 126 to monitor software usage and ensure compliance with relevant licensing schemes. As alluded to above, the platform's integration with hardware and software providers, and ability to monitor hardware and software usage at discrete levels of granularity, facilitates new types of pricing schemes. In addition to consumption-based on-demand pricing based on hardware and software usage (i.e., time), results-based and other forms of pricing (e.g., based on hardware resource consumption) can be supported in other embodiments.

For example, in one embodiment, pricing is based on the "success" of a job—measured by specified goals determined from the results extracted from the software during or after completion of a job. In another embodiment, advance purchases of blocks of time are supported—i.e., as nonrefundable amounts against which actual monitored hardware and/or usage is applied. Such block purchases are provided at "volume discount" prices, with overages either forbidden or charged at premium rates.

Various consumption-based, results-based and other hardware and software pricing and licensing schemes will be evident to those skilled in the art, all of which are supported by the platform's integration with multiple hardware and software providers, as well as its tightly integrated monitoring mechanisms both within and across individual tasks, jobs and more complex HPC workflows. This multi-provider approach affords HPC users 155 improved visibility into the costs of HPC workflows, as well as flexibility to optimize for cost, time and other desired factors by "mixing and matching" different hardware and software environments, "bursting" from on-premise hardware into the cloud for excess capacity, and other configuration, pricing and licensing options.

Figure 2:
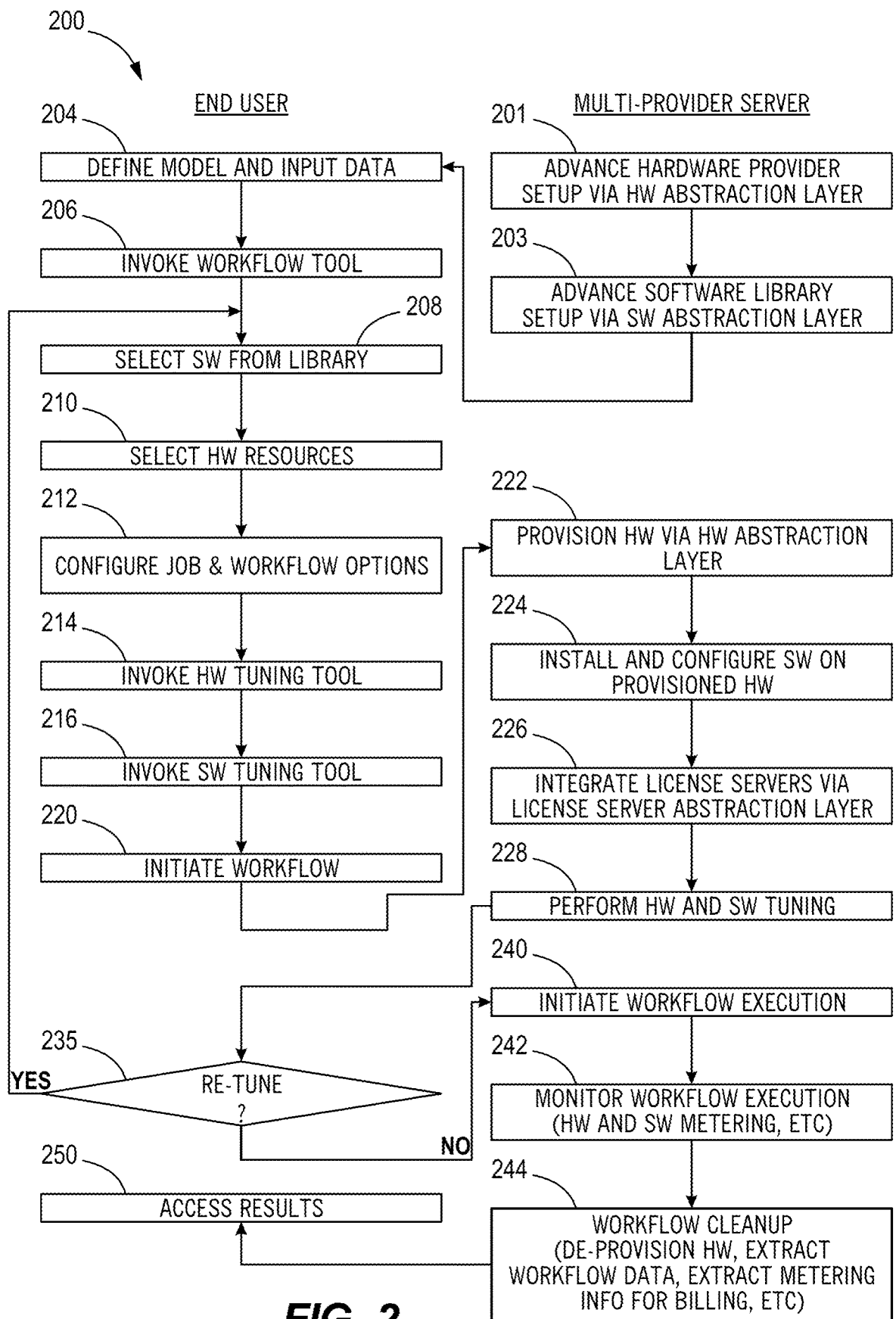
FIG. 2 is a flowchart illustrating one embodiment of an interactive workflow generation and execution process performed by a multi-provider server of the cloud-based platform of the present invention.

Flowchart 200 in FIG. 2 provides a dynamic look (from the perspective of an HPC user 155) into the design and execution of an HPC workflow. Before any HPC user 155 even begins to design a job or workflow, the platform establishes in advance hardware provider setups in step 201 with Back-End Hardware Providers 115 (via Hardware Abstraction Layer 110). In one embodiment, the platform provisions and installs the functionality of Multi-Provider Server 101 on a selected Back-End Hardware Providers 115, from which it provides the various abstraction and integration layers discussed above with other third-party providers.

Moreover, in step 202, the platform generates and installs images of each version of software in its software library for each supported operating system, along with the necessary software drivers. This enables the platform to install the appropriate image of any selected software package on any provisioned hardware environment with the assurance that compatibility has already been confirmed. The platform further implements, via User Interface Layer 150, the Web 156, CLI 157 and API Client 158 interfaces through which HPC users 155 access the platform.

When an HPC user 155 initially desires to prepare and execute a workflow on the platform, the user typically first defines its model and prepares the input data it will supply to initialize the desired software (in step 204). HPC user 155 then invokes the platform's workflow tool in step 206 and provides the platform with its model and input data. The platform's workflow tool presents HPC user 155 with the software library from which HPC user 155 selects, in step 208, one or more desired software packages. As noted above, a workflow can involve multiple software packages, whether as part of a single job or a more complex multi-job workflow.

Then, in step 210, the workflow tool presents HPC user 155 with a list of available hardware resource "core types" and other server configurations available from Back-End Hardware Providers 115. In one embodiment, the platform generates and presents these options at a higher level of abstraction than the specific core types and physical server configurations offered by each Back-End Hardware Provider 115. In other embodiments, the options identify the particular Back-End Hardware Providers 115 that provide such options (e.g., to enable HPC user 155 to select or avoid a desired provider).

In another embodiment, this list is filtered based upon the user's previous selection of software (e.g., if selected software is not compatible with, or otherwise unavailable on, certain back-end hardware provider platforms). In other embodiments, the platform analyzes the user's model and other input data, and provides recommended hardware resource options to HPC user 155 based on that analysis. One embodiment of this recommendation process is discussed in greater detail below with respect to FIGS. 3-5.

Once HPC user 155 selects from among the available hardware resource options, the platform's workflow tool presents HPC user 155 with an interface to configure the workflow and each component job. As discussed above, this configuration is application-dependent based upon the selected software packages, as well as the user's model and other input data. Here too, the choices are presented at a higher-level abstraction, as the platform automatically resolves any dependencies between the previously selected hardware and software options. In one embodiment, the workflow tool automatically configures those hardware-specific options that are determined based on the previously selected hardware computing resources (though additional specification of hardware-specific parameters, such as a desired number of cores, may still be required).

With the assistance of the platform's workflow tool, HPC user 155 determines the desired control flow configuration (e.g., if multiple HPC tasks and/or multiple jobs are involved) and specifies them in accordance with the options provided by the workflow tool. As described above, the workflow might involve multiple software packages, with the control flow determining the conditions under which subsequent software packages are invoked, as well as whether the results of one package are provided as input to another package.

If any pre-workflow hardware or software tuning is desired, HPC user 155 invokes the HW Tuning tool in step 214 and/or the SW Tuning Tool in step 216. In one embodiment, the platform presents common templates for hardware and software tuning. In another embodiment, an optimizer tool is provided, enabling HPC user 155 to specify desired optimization factors (e.g., time, cost, etc.) as well as conditions under which specified hardware resource configurations will be accepted or rejected. In yet another embodiment, HPC user 155 provides a custom script specifying the precise control flow of hardware and/or software tuning processes.

HPC user 155 initiates the defined workflow in step 220. Note, however, that if HPC user 155 specified any hardware or software tuning "test runs" in steps 214 or 216, then the platform will execute those test runs first, as explained below.

In step 222, Multi-Provider Server 101 provisions the selected hardware computing resources on the one or more Back-End Hardware Providers 115 selected by (or generated for) HPC user 155 in step 210. Multi-Provider Server 101 also replicates the model and user input data into the provisioned hardware environment.

In step 224, Multi-Provider Server 101 installs the appropriate versions of the selected software images into the provisioned hardware environment, and then configures such software in accordance with the specified configuration defined in step 212. As noted above, multiple instances of the software may be further replicated (e.g., into multiple VMs or physical servers, and potentially across multiple back-end hardware providers) depending upon the hardware resource configuration (e.g., based on the number of specified cores). Additional instances may also be replicated and/or destroyed during execution of the workflow.

In step 226, Multi-Provider Server 101 configures connections between the software installed and configured in the provisioned hardware environment and each relevant License Server 128 (via SW Abstraction Layer 120). This enables the software to execute properly once HPC user 155 is authenticated and individual features are checked out and checked in during execution of the workflow.

In one embodiment, license keys with relatively short durations (e.g., 1 day instead of 1 year) are generated repeatedly to provide an added layer of security (e.g., to prevent "phony" license servers from continuing operation upon obtaining a valid license key). License Manager 126 manages frequent (e.g., daily) communications with the relevant License Servers 128 (via SW Abstraction Layer 120) to authenticate these frequently regenerated license keys and ensure continued access by authorized HPC users 155.

At this point, in step 228, Multi-Provider Server 101 performs any specified hardware and/or software tuning test runs. Though typically far smaller and quicker than actual jobs or workflows, these test runs may, in one embodiment, result in automatic reconfiguration of the specified computing resources. In other embodiments, the platform generates recommendations to HPC user 155, or merely provides results from which HPC user 155 makes its own determining regarding any such reconfigurations. One embodiment of this recommendation process is discussed in greater detail below with respect to FIGS. 3-5.

Thus, in step 235, the HPC user 155 (or the platform, in the other embodiments discussed above), determines whether to "re-tune" the hardware and/or software selections previously made in steps 208 and 210. If re-tuning is necessary or desired, control returns to step 208 (at which point further hardware and/or software tuning may or may not occur, depending on whether HPC user 155 re-invokes the hardware and/or software tuning tool. As noted above, in one embodiment (not shown), the platform automatically reconfigures the computing resources and re-initiates the workflow execution in step 220 (as re-provisioning may be required).

Otherwise, once no re-tuning is dictated in step 235, Multi-Provider Server 101 initiates execution of the "full" workflow in step 240. As described above, the platform monitors execution of the workflow in step 242, including hardware and software metering (for usage and billing purposes), as well as for implementation of the control flow specified in the workflow.

Upon completion of the workflow execution (including early termination in certain instances), the platform implements a "cleanup" process in step 244. Results are extracted, stored and provided to the HPC user 155 in step 250 (via User Interface Layer 150). In addition, the platform de-provisions hardware resources and extracts and stores metered hardware and software usage information on the platform for billing and other purposes, as described above. As also described above, analytics may be performed on the results (including, in one embodiment, during execution of the workflow), though execution of such analytics software is considered part of the workflow itself (as such software is part of the platform's software library).

As alluded to above, the present invention employs novel systems and methods to generate compute infrastructure recommendations (e.g., recommended core types/counts) based on user performance metrics (from jobs running the user's User Input Model) as well as benchmark performance metrics and core type performance metrics. In other words, the present invention recognizes that benchmarks are not a sufficiently accurate and reliable substitute for User Input Models because benchmark performance metrics (even in conjunction with core type metrics) do not adequately represent the manner in which a software application running a User Input Model utilizes computing resources (in particular with respect to bottlenecks of specific resources encountered during a job running a User Input Model).

The following discussion describes key types of data stored in the Compute Infrastructure Performance Database and the process by which the Recommendation Engine 185 generates, measures and stores benchmark performance metrics and core type performance metrics, and performs related calculations on such data. It also describes the key components of the Recommendation Engine 185 and the detailed process by which it generates compute infrastructure recommendations.

Turning to FIG. 3, table 300 illustrates key data generated and stored in one embodiment of the Compute Infrastructure Performance Database 310 of the present invention. The Compute Performance Generator 412 of Recommendation Engine 401, with assistance from Benchmark Orchestration Manager 414 (all of which are described below with respect to FIG. 4), performs a series of benchmark runs across various compute infrastructure (e.g., core types and core counts) involving multiple categories of software applications, each of which has one or more associated benchmarks.

The purpose of these benchmarks runs is to gather, measure and perform calculations on data (stored in Compute Infrastructure Performance Database 310) representative of the performance of particular benchmarks. Recommendation Engine 401 utilizes such data (including benchmark performance metrics and core type performance metrics), along with user performance metrics (generated from one or more jobs running a user's User Input Model) to generate recommendations of compute infrastructure (e.g., core type/count recommendations) for a user's subsequent jobs running its User Input Model.

In one embodiment, these benchmark runs are performed across multiple simulation software categories (CFD, FEA, etc.), each of which includes one or more software applications (e.g., StarCCM+ and ANSYS Fluent, both of which fall in the CFD category). Each software application has one or more associated benchmarks, each of which is designed to compare the performance of the software application across multiple core types/counts.

As noted above, each benchmark run involves execution of a particular software application (within a category, such as CFD) running a specific benchmark (as input) on certain compute infrastructure (e.g., a core type/count combination, with each core type having an associated number of cores per node). Each of these items is stored as Inputs 312 in Compute Infrastructure Performance Database 310.

In one embodiment, Benchmark Orchestration Manager 414 orchestrates this process of performing benchmark runs across multiple core types and multiple core counts of each core type. Each set of these benchmark runs is repeated, within each software category, for each software application within that software category, and for each benchmark associated with a particular software application.

During the benchmark run, Compute Performance Generator 412 monitors and performs certain Measurements 314 to capture data for storage in Compute Infrastructure Performance Database 310. In one embodiment, such Measurements 314 include the duration of the benchmark run (e.g., 8 hours) and a Hardware Signature based on monitoring the utilization of computing resources during the benchmark run. Note that the Hardware Profiles of each Hardware Signature are represented as graphs in Measurements column 314, illustrating their utilization of a particular hardware resource over time during the benchmark run. Data structures including numerical values corresponding to these graphs are actually stored in Compute Infrastructure Performance Database 310.

In addition to these benchmark performance metrics, Measurements 314 include core type performance metrics reflecting the performance of special software programs (or "microbenchmarks") running on a single node of each core type. As alluded to above, these core type performance metrics are measured during execution of the special software programs, and not during benchmark runs. These values are therefore independent of any software application or benchmark.

In addition to Inputs and Measurements, Compute Performance Generator 412 performs a series of Calculations 416 to facilitate the recommendation of compute infrastructure options by Recommendation Engine 401. In one embodiment, Compute Performance Generator 412 utilizes the core type performance metrics to calculate an ordered set of Prioritized Bottlenecks specific to each benchmark (as discussed in greater detail below).

As noted above, Compute Performance Generator 412 also calculates, with respect to each benchmark, normalized RPI values reflecting the performance of core types relative to a "baseline" core type. As explained in greater detail below, RPI values corresponding to a core type may vary across benchmarks and software applications.

Yet these RPI values are normalized across benchmarks and software applications. For example, a particular core type may have an RPI value of 1.2 with respect to one benchmark, and a value of 0.8 with respect to another benchmark. In both cases, these normalized RPI values indicate whether such performance is better (1.2) or worse (0.8) than the performance of the baseline core type (1.0) corresponding to their respective benchmarks.

As noted above, Recommendation Engine 401 employs RPI values to compare the performance of core types with respect to the user's chosen software application and make a tentative initial recommendation of a core type on which the user will run a job invoking its selected software application to run its User Input Model for the purpose of generating a Hardware Signature. This tentative initial recommendation is only necessary to obtain a Hardware Signature reflective of the utilization of computing resources when the user's chosen software application runs the User Input Model. Recommendation Engine 401 will utilize that Hardware Signature to make its actual core type/count recommendations, as discussed in greater detail below.

Finally, in this embodiment, Compute Performance Generator 412 also calculates RSS values which, as noted above, reflect the scalability of a core type across its available core counts with respect to benchmark runs involving a specific software application running a particular benchmark. As explained in greater detail below, RSS values are employed by Recommendation Engine 401 to facilitate core count recommendations for recommended core types.

Once Compute Performance Generator 412, assisted by Benchmark Orchestration Manager 414, performs the benchmark runs discussed above, along with the described Measurements 314 and Calculations 316, and stored all resulting data (including Inputs 312) in Compute Infrastructure Performance Database 310, other components of Recommendation Engine 401 initiate the process of generating compute infrastructure recommendations.

Figure 4:
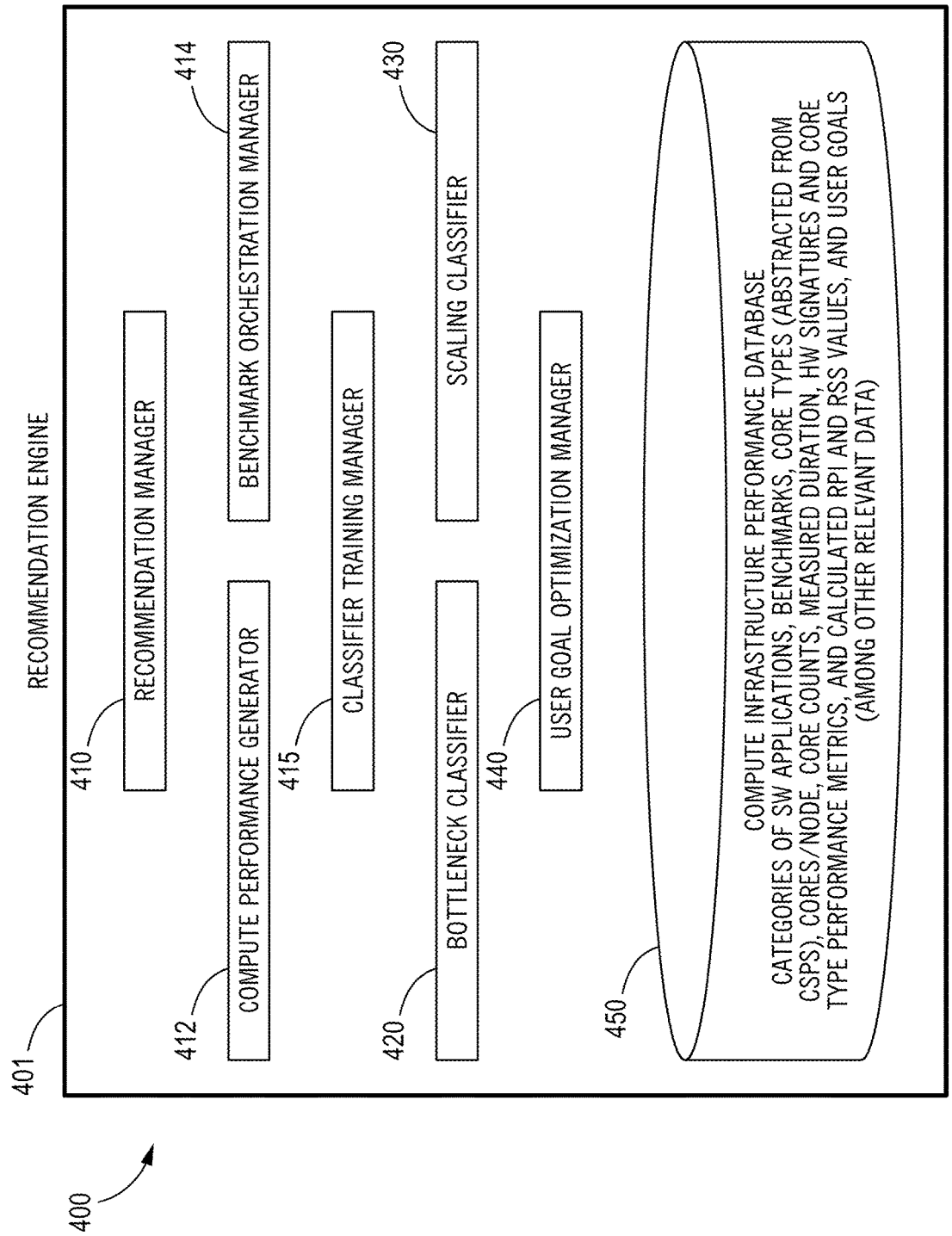
FIG. 4 is a block diagram illustrating key components of one embodiment of a Recommendation Engine component of a multi-provider server of the cloud-based platform of the present invention.
Figure 5:
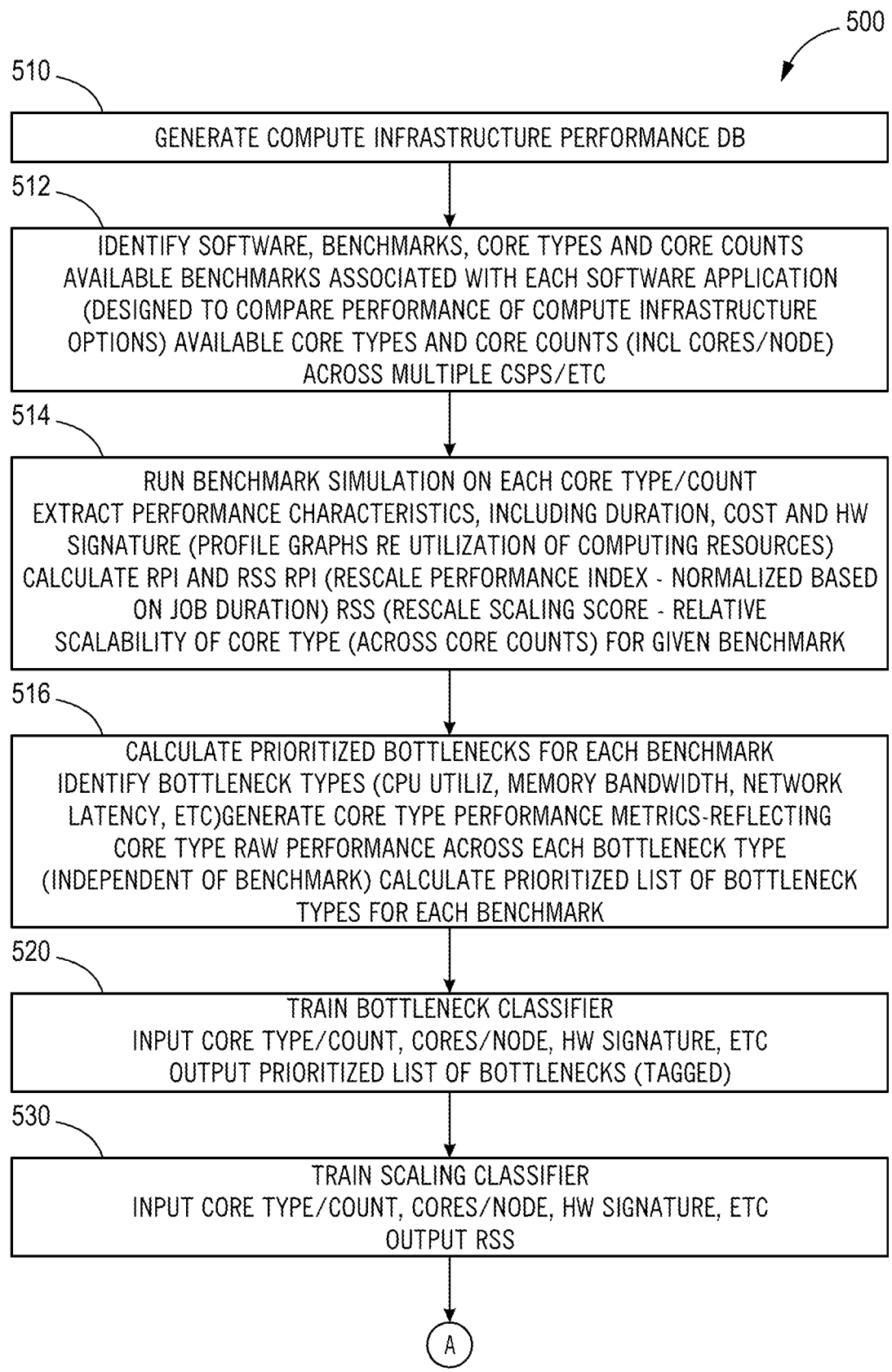
FIG. 5 is a flowchart illustrating key steps of one embodiment of a Recommendation Engine component of a multi-provider server of the cloud-based platform of the present invention.
Figure 5:
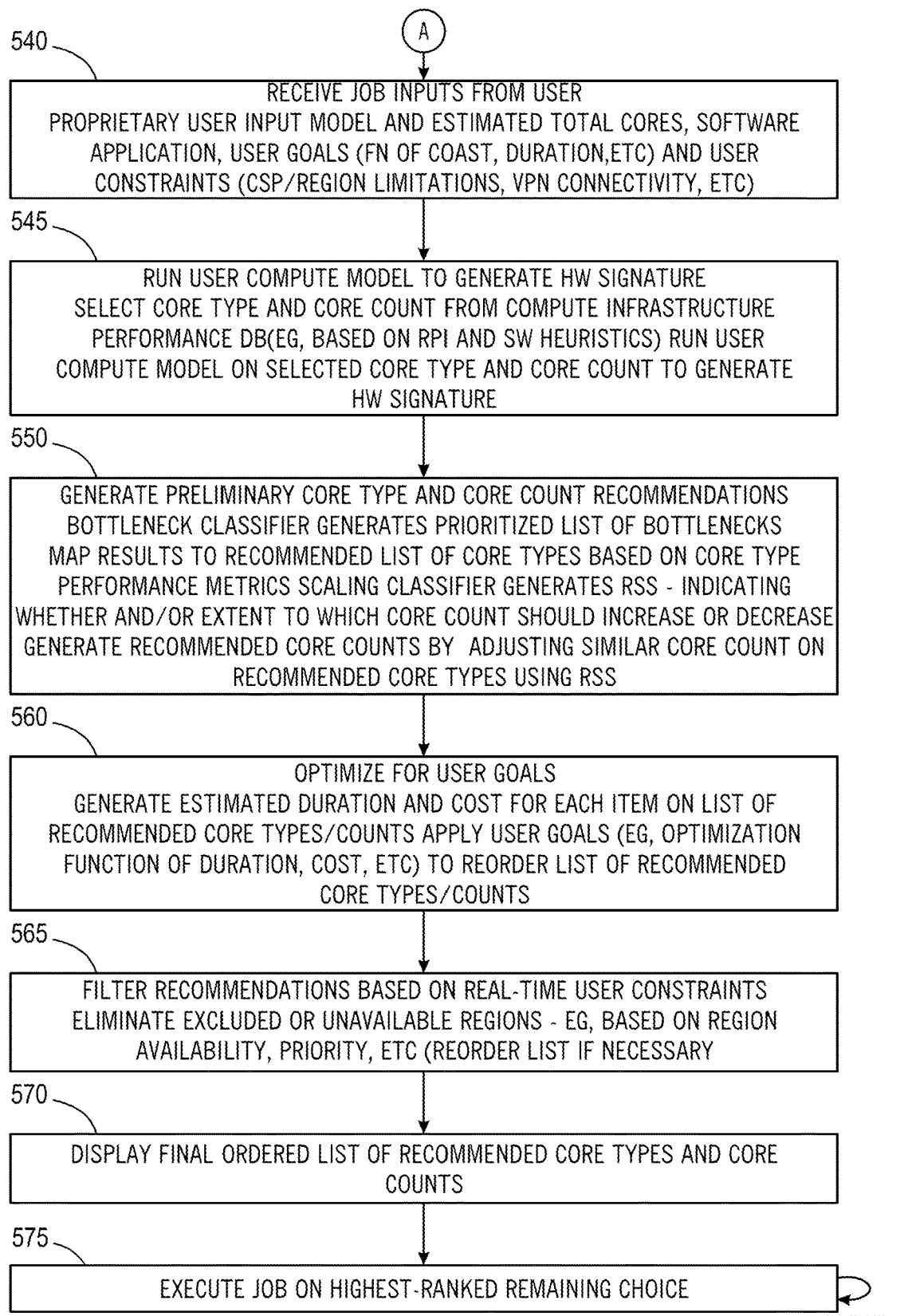

Before exploring the detailed description of this process, an embodiment of which is illustrated in FIG. 5, it is helpful to identify the key components of Recommendation Engine 401 which perform the steps of this process. Turning to FIG. 4, block diagram 400 illustrates one embodiment of these key components.

In one embodiment, Recommendation Manager 410 manages the overall process, including an initial stage of performing the benchmark runs and populating Compute Infrastructure Performance Database 450. Benchmark Orchestration Manager 414 facilitates the setup and performance of the benchmark runs, for example, by varying inputs including software applications, benchmarks, core types and core counts, as well as other procedural aspects of the process.

Recommendation Manager 410 also manages subsequent steps of the compute infrastructure recommendation process, which are explained in greater detail below. In one embodiment, such steps include training machine learning classifiers, obtaining user performance metrics via jobs running User Input Models, using the trained machine learning classifiers and processing their outputs to generate core type and core count recommendations that satisfy User Goals, and other related steps of this overall process.

In one embodiment, data stored in Compute Infrastructure Performance Database 450 includes not only benchmark performance metrics and core type performance metrics, and all inputs and measured and calculated values, but also miscellaneous data defining User Goals, software heuristics relating to typical behavior of software applications and other relevant data. In other embodiments, separate databases are employed to store certain data. The data structures implemented for all of these databases are determined based on various engineering tradeoffs, and do not significantly impact the concepts underlying the present invention.

In one embodiment, as noted above, machine learning classifiers are employed to facilitate the generation of recommended compute infrastructure, such as recommended core types and core counts. In other embodiments, the data stored in Compute Infrastructure Performance Database 450 is processed without the use of machine learning. For example, in one embodiment, Hardware Signatures generated from running User Input Models are "matched" to those stored for individual benchmarks to identify a "proxy benchmark" that most closely represents the manner in which the user's software application running a User Input Model utilizes computing resources. Recommended core types and core counts are then selected based on the stored data for this proxy benchmark.

Other alternatives to this proxy benchmark approach are also employed without departing from the spirit of the present invention. In other words, these alternative "non-machine-learning" embodiments still involve an analysis of the manner in which a software application running a User Input Model utilizes computing resources (i.e., user performance metrics), and a correlation to benchmark performance metrics based on benchmarks yielding similar uses of computing resources. In this manner, the correlation of user performance metrics to benchmark performance metrics addresses the shortcomings of relying solely on benchmarks (e.g., duration and cost of benchmark runs) as substitutes for User Input Models.

With respect to embodiments employing machine learning, Classifier Training Manager 415 manages the training of such classifiers. In one embodiment, explained in greater detail below, two classifiers are employed—Bottleneck Classifier 420 (which generates an ordered and weighted list of bottlenecks from which recommended core types are mapped) and Scaling Classifier 430 (which generates an RSS value representing the scalability of a recommended core type).

In this embodiment, a training sample is generated from each benchmark run. Benchmark performance metrics, including in particular the Hardware Signature, are provided as inputs to Bottleneck Classifier 420 and Scaling Classifier 430, while the Prioritized Bottleneck values and RSS values respectively represent "tagged outputs" of the training samples provided to Bottleneck Classifier 420 and Scaling Classifier 430.

Once the classifiers are trained, Recommendation Manager 410 obtains a Hardware Signature (and other user performance metrics) from a job in which the user's software application runs the user's User Input Model, and provides such user performance metrics as inputs to Bottleneck Classifier 420 and Scaling Classifier 430. As explained in greater detail below, the outputs of these classifiers are mapped to recommended core types and core counts in a manner that best satisfies the specified User Goals, with the assistance of User Goal Optimization Manager 440.

In another embodiment, Bottleneck Classifier 420 and Scaling Classifier 430 are integrated into a single classifier. As will be explained in greater detail below, various iterative and other algorithms may be employed to obtain final recommended core types/counts (or an ordered list of core types/counts) from one or more classifiers without departing from the spirit of the present invention.

Turning to FIG. 5, flowchart 500 illustrates one embodiment of the detailed steps of this process of obtaining recommended compute infrastructure, including core types and core counts. As noted above, this process is performed by Recommendation Engine 401, with the various steps managed by Recommendation Manager 410.

As a preliminary step 510 (before generating compute infrastructure recommendations for user jobs), Compute Performance Generator 412 performs a series of benchmark runs (orchestrated by Benchmark Orchestration Manager 414) to begin populating Compute Infrastructure Performance Database 450.

In step 512, Compute Performance Generator 412 identifies the key components needed to perform benchmark runs. These include the various software applications across software categories, and the available benchmarks. As noted above, each benchmark is associated with a particular software application.

In addition to the software applications and corresponding benchmarks in each software category, Compute Performance Generator 412 also identifies the available core types (each having a specified number of cores per node) and core counts available on the platform. In one embodiment, these core types and core counts are available from multiple different CSPs (public, private, virtual, bare-metal, etc.), as well as from other potential sources, including on-premise hardware.

In step 514, Compute Performance Generator 412 performs a series of benchmark runs (orchestrated by Benchmark Orchestration Manager 414) to begin collecting benchmark performance metrics and populating Compute Infrastructure Performance Database 450. As noted above, for each benchmark run, Inputs 312 are stored in Compute Infrastructure Performance Database 450, including the software application (and its category), its corresponding benchmark and the compute infrastructure on which the benchmark was performed (e.g., the core type and its corresponding cores per node, and the core count).

In addition, Compute Performance Generator 412 monitors each benchmark run and performs various Measurements 314 to obtain and store certain benchmark performance metrics in Compute Infrastructure Performance Database 450. These benchmark performance metrics include the duration of the benchmark run and the Hardware Signature extracted from monitoring its utilization of computing resources (e.g., CPU, memory bandwidth, network latency, etc.). As noted above, the Hardware Signature includes multiple Hardware Profiles, each of which corresponds to a characteristic of a particular computing resource (while, in other embodiments, multiple Hardware Profiles are extracted with respect to multiple different characteristics of the same hardware resource).

Upon completing the benchmark runs and measuring, extracting and storing resulting benchmark performance metrics in Compute Infrastructure Performance Database 450, Compute Performance Generator 412 also calculates RPI and RSS values in step 514. As noted above, the RPI values represent the performance of a core type (normalized relative to a baseline core type) with respect to a particular benchmark, while RSS values reflect the scalability of a core type across its available core counts with respect to that benchmark.

In one embodiment, RPI values are calculated by first identifying a core type as a baseline core type—e.g., core type #1 in table 300 of FIG. 3. Ultimately, Compute Performance Generator 412 assigns an RPI value of "1.0" to that baseline core type.

Initially, however, Compute Performance Generator 412 calculates "raw" performance values for each core count of a core type (starting with the baseline core type) based on an inverse of the duration of the corresponding benchmark run. Compute Performance Generator 412 then calculates an overall raw value for the core type as a weighted average of those discrete values.

This weighted average takes into account the different core counts available for a given core type, enabling the normalization of RPI values across different core types. For example, in the "Core Count" column in table 300 of FIG. 3, baseline core type #1 shows available core counts of 72, 144, 576 and 1152, while core type #2 shows available core counts 64, 128, 256, 512 and 1024.

Having determined the raw value for baseline core type #1, Compute Performance Generator 412 deems this value to be equal to an RPI value of 1.0. Compute Performance Generator 412 calculates similar raw values for the remaining core types of the benchmark (e.g., Benchmark #1) based on the duration of their benchmark runs. Compute Performance Generator 412 then converts the resulting raw values for each such core type to an RPI value relative to the RPI value of the baseline core type.

For example, as illustrated in the RPI column of table 300 of FIG. 3 for Benchmark #1, baseline core type #1 has an RPI value of 1.0, while core type #2 has an RPI value of 1.1 (indicating relatively faster performance than baseline core type #1) and core type #3 has an RPI value of 0.7 (indicating relatively slower performance than baseline core type #1).

Compute Performance Generator 412 repeats this process for the remaining benchmarks. In one embodiment, the same core type is deemed the baseline core type across the remaining benchmarks. In other embodiments, additional normalized RPI values are generated to enable RPI values to be compared more accurately across benchmarks.

Compute Performance Generator 412 repeats the process of calculating the raw core type/count values for each subsequent benchmark, as the duration of a benchmark run for a particular core type/count will likely differ across benchmarks. For example, with respect to the RPI column for Benchmark #2 in table 300 of FIG. 3, the RPI value for baseline core type #1 is still 1.0, despite the fact that its raw value for Benchmark #2 was likely different from its raw value for Benchmark #1.

Turning to step 516, Compute Performance Generator 412 completes the population of Compute Infrastructure Performance Database 450 by running special programs ("microbenchmarks") across a single node of each core type, and capturing core type performance metrics of particular computing resources, as illustrated in the Core Type Performance columns (for CPU, MEM and NTWK) in table 300 of FIG. 3. Unlike benchmark runs (in which software applications run benchmarks as input), these special programs are designed to compare the performance of compute infrastructure (e.g., core types) independent of any benchmark or associated software application.

In one embodiment, Compute Performance Generator 412 calculates performance results reflecting the relative performance (across core types) of each specific computing resource (e.g., CPU, memory and network hardware). In essence, these core type computing metrics reflect the relative speed across core types of each computing resource.

For example, a core type with a faster CPU will typically generate a higher CPU core type performance value. Similarly, core types with faster memory (i.e., greater memory bandwidth) will typically generate a higher MEM core type performance value, and core types with faster network hardware (i.e., lower latency) will typically generate a higher NTWK core type performance value.

As noted above, the core type performance metrics for each core type are independent of any benchmark or software application. Therefore, for each core type, there will only be one set of core type performance metrics covering each monitored computing resource (e.g., CPU, MEM and NTWK).

For example, in the Core Type Performance columns for core type #3 in table 300 of FIG. 3 (on a scale of 0 to 1), the CPU performance value is 0.8 (indicating relatively fast CPU speed), the MEM performance is 0.7 (indicating slightly above average memory speed) and the NTWK performance value is 0.2 (indicating slow network speed—i.e., high latency). Comparing values for core type #2, CPU performance is slightly higher (0.9 v 0.8), MEM performance is slightly lower (0.6 v 0.7) and NTWK performance is significantly improved—i.e., lower latency (0.5 v 0.2).

Having calculated the core type performance metrics, Compute Performance Generator 412 then calculates a set of Prioritized Bottlenecks for each benchmark based on the core type performance metrics for all core types. In one embodiment, bottlenecks are identified with respect to each benchmark based on the correlation (across core types) of (I) the RPI values (calculated from benchmark runs of a particular benchmark on each core type) to (ii) the core type performance metrics (calculated for each computing resource on each core type), which are independent of benchmarks.

In essence, a bottleneck with respect to a particular computing resource (e.g., CPU) is determined by the extent to which the performance of that computing resource correlates across core types, positively or negatively, with the RPI values for those core types. The greater the correlation, the greater the extent to which that computing resource is a bottleneck. For example, with respect to performance across core types, if NTWK performance increases and decreases to the same extent RPI increases and decreases (when running that benchmark), then NTWK performance is a significant bottleneck with respect to that benchmark. Conversely, if there is little correlation across core types between the performance of a computing resource (e.g., MEM) and RPI values, then MEM is less of a bottleneck with respect to that benchmark.

In one embodiment, Compute Performance Generator 412 calculates, for each benchmark, the extent of correlation across core types (between core type performance metrics and RPI values) for each particular computing resource, and stores a percentage in Compute Infrastructure Performance Database 450 ranging from 0%, indicating no correlation or bottleneck, to 100%, indicating complete correlation and a maximally significant bottleneck.

In another embodiment, if the degree of correlation falls below a predefined threshold (as illustrated in the Prioritized Bottlenecks column corresponding to Benchmark #2 in table 300 of FIG. 3, then no entry for that bottleneck is stored. In other embodiments, an ordered list of bottlenecks is stored without any percentages indicating the degree to which each computing resource is bottlenecked during benchmark runs of a particular benchmark.

Having completed step 516 and fully populated Compute Infrastructure Performance Database 450, the process turns to the training of Bottleneck Classifier 420 and Scaling Classifier 430 by Classifier Training Manager 415. In step 520, Classifier Training Manager 415 processes training samples from Compute Infrastructure Performance Database 450 for the purpose of training Bottleneck Classifier 420.

At a high level, Bottleneck Classifier 420 is trained to correlate Hardware Signatures with a set of Prioritized Bottlenecks (calculated from core type performance metrics) to facilitate core type recommendations to users. Once trained, Bottleneck Classifier 420 is employed, as discussed below, to generate a list of Prioritized Benchmarks from a Hardware Signature generated by running a user's User Input Model (rather than a benchmark). These Prioritized Benchmarks are then mapped to an ordered list of recommended core types using the core type performance metrics stored in Compute Infrastructure Performance Database 450, as described in greater detail below.

During training, Classifier Training Manager 415 generates a training sample with respect to each benchmark run, and provides that training sample to Bottleneck Classifier 420. The input of each training sample includes the corresponding Hardware Signature generated from that benchmark run, along with compute infrastructure data (e.g., identifiers for the core type, nodes per core and core count on which the benchmark run was performed). In other embodiments, additional inputs are included, such as identifiers for the software application and associated benchmark, and other relevant data from Compute Infrastructure Performance Database 450.

Classifier Training Manager 415 also provides a tagged output to Bottleneck Classifier 420, including the ordered and weighted list of Prioritized Bottlenecks (e.g., NTWK 75%, CPU 65% and MEM 55%). As described above, this list of Prioritized Bottlenecks is identical for each benchmark run of a particular benchmark.

Classifier Training Manager 415 continues to provide these inputs and tagged outputs to Bottleneck Classifier 420 with respect to each remaining benchmark run (i.e., across all software categories, software applications and associated benchmarks and all core type/count combinations).

In one embodiment, Classifier Training Manager 415 provides multiple sets (batches, epochs, etc.) of these training samples to Bottleneck Classifier 420 over time, with intervals for adjusting the weights of the classifier, until Bottleneck Classifier 420 is deemed sufficiently trained. In another embodiment, Compute Infrastructure Performance Database 450 is updated periodically and used to retrain (or update the training of) Bottleneck Classifier 420. Various well-known techniques of training machine-learning classifiers may be employed without departing from the spirit of the present invention.

In step 530, Classifier Training Manager 415 processes training samples from Compute Infrastructure Performance Database 450 for the purpose of training Scaling Classifier 430. At a high level, Scaling Classifier 430 is trained to correlate Hardware Signatures with RSS values (calculated from the relative duration of benchmark runs across each core count of a core type, as discussed above) to facilitate core count recommendations to users with respect to recommended core types.

Once trained, Scaling Classifier 430 is employed, as discussed below, to generate an RSS value from a Hardware Signature generated by running a user's User Input Model (rather than a benchmark). This RSS value is then employed, as described below, to facilitate the generation of a recommended core count corresponding to a recommended core type in a manner that best satisfies the user's specified User Goals.

During training, Classifier Training Manager 415 generates a training sample with respect to each benchmark run, and provides that training sample to Scaling Classifier 430. The input of each training sample includes the corresponding Hardware Signature generated from that benchmark run, along with compute infrastructure data (e.g., identifiers for the core type, nodes per core and core count on which the benchmark run was performed). In other embodiments, additional inputs are included, such as identifiers for the software application and associated benchmark, and other relevant data from Compute Infrastructure Performance Database 450.

Classifier Training Manager 415 also provides a tagged output to Scaling Classifier 430, including the RSS value calculated as described above (with respect to each benchmark) for each core count of each core type associated with benchmark runs of that benchmark. Although RSS values are calculated based on the results of multiple benchmark runs (i.e., for each core count of a core type), a distinct RSS value is calculated for each benchmark run. Each training sample therefore includes that distinct single RSS value as the tagged output for each training sample.

Classifier Training Manager 415 continues to provide these inputs and tagged outputs to Scaling Classifier 430 with respect to each remaining benchmark run (i.e., across all software categories, software applications and associated benchmarks and all core type/count combinations). As was the case with the training of Bottleneck Classifier 420, Classifier Training Manager 415 provides multiple sets (batches, epochs, etc.) of these training samples to Scaling Classifier 430 over time, with intervals for adjusting the weights of the classifier, until Scaling Classifier 430 is deemed sufficiently trained.

In another embodiment, Compute Infrastructure Performance Database 450 is updated periodically and used to retrain (or update the training of) Scaling Classifier 430. Here too, various well-known techniques of training machine-learning classifiers may be employed without departing from the spirit of the present invention.

Having fully populated Compute Infrastructure Performance Database 450 and trained both Bottleneck Classifier 420 and Scaling Classifier 430, the process continues once a user is ready to submit a job and obtain recommended compute architecture options, including a recommended core type and core count. Turning to step 540, a user submits job inputs to Recommendation Manager 410.

In one embodiment, the job inputs include the user's proprietary User Input Model with an estimated number of cores, an identifier of the user's chosen software application, the user's specified User Goals and any specified "User Constraints," such as CSP and region limitations, VPN connectivity, etc. Recommendation Manager 410 stores these job inputs in Compute Infrastructure Performance Database 450 (or, in another embodiment, in a distinct database) for use in obtaining inputs to Bottleneck Classifier 420 and Scaling Classifier 430.

In step 545, Recommendation Manager 410 uses the job inputs to obtain an initial recommendation of a core type on which the user will run a job invoking its selected software application to run its User Input Model for the purpose of generating a Hardware Signature (based on the User Input Model rather than on a benchmark). In one embodiment, Recommendation Manager 410 accesses Compute Infrastructure Performance Database 450 to obtain an initial recommended core type based on the core type with the highest RPI value generated from benchmark runs of the user's chosen software application. In this embodiment, it selects an initial recommended core count based on distinct RPI values (not shown in table 300 of FIG. 3) for individual core counts of that core type.

In other embodiments, additional normalized RPI values (also not shown in table 300 of FIG. 3) are employed for use in comparing RPI values for a core type across benchmarks. In still other embodiments, software heuristics (obtained from analyses of the user's chosen software application) are employed to select the recommended core type and core count. In one embodiment, if the user's chosen software application is not included in Compute Infrastructure Performance Database 450, then Recommendation Manager 410 relies on RPI values corresponding to a software application within the same category to generate its initial core type and core count recommendation.

Compute Performance Generator 412 then executes a job in which the user's chosen software application runs the user's User Input Model on the initial recommended core type and core count for the purpose of generating a Hardware Signature (based on the User Input Model and not a benchmark). In another embodiment, additional user performance metrics include the duration and cost of the job.

In step 550, Recommendation Manager 410 submits the Hardware Signature (generated from running the User Input Model) to both Bottleneck Classifier 420 and Scaling Classifier 430. It obtains an ordered and weighted list of Prioritized Bottlenecks from Bottleneck Classifier 420, and a single RSS value from Scaling Classifier 430. In other embodiments, the Prioritized Bottlenecks include only an ordered list of bottlenecks with no weighting.

Compute Performance Generator 412 then maps the Prioritized Bottlenecks to a recommended list of core types based on the core type performance metrics. For example, assume that the output of Bottleneck Classifier 420 consists of the following weighted Prioritized Bottlenecks: CPU 70%, NTWK 60% and MEM 50%. In one embodiment, Compute Performance Generator 412 extracts, for each core type, the core type performance metrics for each of the computing resources and calculates a single value by multiplying each stored value by its associated weighted percentage, and then summing the results. It then calculates a single value in a similar manner for each remaining core type, and then generates an ordered list of core types based on the highest calculated values.

In another embodiment, Bottleneck Classifier 420 does not generated weighted bottlenecks, but only an ordered list of bottlenecks (e.g., CPU and MEM and NTWK, or just MEM and CPU without NTWK due to its failure to meet a predefined threshold of "bottleneck significance"). In that embodiment, a similar approach is followed, but using only the core type performance values on the Prioritized Bottleneck list.

Having obtained an ordered list of recommended core types and a single RSS value, User Goal Optimization Manager 440 then, in step 560, converts the RSS value into a corresponding core count for each recommended core type (based on available core counts for each recommended core type) and generates an estimated duration (and cost) for each recommended core type/count on the list (e.g., by extrapolating from the available user performance metrics and benchmark performance metrics). It then applies the User Goals and/or optimization function to reorder the list of recommended core types/counts in a manner that best satisfies the User Goals. The process then proceeds to step 565.

In an alternative embodiment, User Goal Optimization Manager 440 iteratively runs jobs in which the user's chosen software application runs the User Input Model on various recommended core type/count combinations. For example, User Goal Optimization Manager 440 selects the highest recommended core type from the current list of recommended core types. It determines the core count by adjusting the core count it previously used to generate its Hardware Signature based on the RSS value generated by Scaling Classifier 430 (e.g., same, lower or higher core count based on the RSS value). Compute Performance Generator 412 then runs that job on the recommended core type and adjusted core count, and extracts the results of that job, which include a duration and a Hardware Signature. It then calculates a single "user data point" with a duration and cost (calculated based on the per-core-hour price charged by the CSP for the recommended core type).

In this alternative embodiment, User Goal Optimization Manager 440 then submits the Hardware Signature to Scaling Classifier 430 to obtain an associated RSS value which indicates whether to increase or decrease the core count (or to leave it unchanged, indicating that an equilibrium has been reached for that core type). For each increase or decrease, Performance Generator 412 then runs another job on the same core type and adjusted core count and extracts the resulting duration and Hardware Signature, from which it calculates another user data point.

This process continues until equilibrium is reached for that core type and a collection of user data points has been generated. User Goal Optimization Manager 440 then repeats this process for the next core type on the current recommended list of core types, resulting in another collection of user data points added to create a larger set of user data points. In one embodiment, this process is repeated for the "top N" core types or, in another embodiment, until a predetermined number of user data points have been generated.

User Goal Optimization Manager 440 then applies the User Goal to the entire set of user data points (each of which is associated with a core type and core count), and generates a reordered set of core type/count recommendations that is optimized for the specified User Goals. As noted above, the User Goals may simply be the lowest cost job, or the job having the shortest duration. Or the User Goals may be a more complex optimization function of cost and duration (or, in other embodiments, may include other related factors).

To avoid the additional time and expense of this alternative embodiment, User Goal Optimization Manager 440 instead (as described above) converts the RSS value into corresponding core counts for each item on the list of recommended core types, generates estimated durations and costs for each item on the list and applies the User Goals to reorder the list. At this point, upon completion of step 560, User Goal Optimization Manager 440 has generated an ordered list of recommended core types/counts that best satisfy the specified User Goals.

Turning to step 565, Recommendation Manager 410 then filters that list based on real-time constraints, including any specified User Constraints. For example, a particular CSP region may be unavailable, or may have been excluded by the user. In one embodiment, Recommendation Manager 410 may reorder the list (by reapplying the User Goals) as a result of such changes, or may select a different region on which the job will be executed.

Once Recommendation Manager 410 has filtered the list it then, in step 570, displays to the user the final ordered list of recommended core types and core counts. If the user accepts the recommendations from Recommendation Engine 401, the user will, in step 575, submit its job for execution on the highest-ranked compute infrastructure in the list of recommended core types/counts. Should the job fail (e.g., due to a "spot kill" or other error), it will be resubmitted on the next-highest-ranked compute infrastructure on the list until the job successfully completes execution (or, in another embodiment, to a different region without changing the core type/count). Here too, Recommendation Manager 410 may reorder the list (by reapplying the User Goals) as a result of these real-time changes.

In one embodiment, after a user has run multiple jobs with the same or similar User Model, and Recommendation Engine 401 detects a pattern (e.g., multiple recommendations of the same or similar compute infrastructure), it will present the user with the option, for future jobs, to "clone" that job immediately after submitting its job inputs described above in step 540. This job clone option will save the user from the time and expense of running one or more jobs in the future to obtain a compute infrastructure recommendation that may be unlikely to change.

It should be noted, however, that many users run a large number of jobs with their User Model, tweaking only certain parameters between job executions. So, even with this job clone feature, users must weigh the added time and expense of running a relatively small number of additional jobs against the probability of obtaining improved recommendations that better satisfy their User Goals.

The present invention has been described herein with reference to specific embodiments as illustrated in the accompanying Figures. Many variations of the embodiments of the functional components and dynamic operation of the present invention will be apparent to those skilled in the art without departing from the spirit of the present invention.

What is claimed is:

1. An integrated cloud-based platform that generates compute infrastructure recommendations for a user's prospective job in which a software application runs a user input model, the integrated cloud-based platform comprising:
   (a) a performance generator that generates:
      (i) a set of benchmark performance metrics reflecting the utilization of computing resources by the software application running each of a plurality of benchmarks across a plurality of compute infrastructure options, and
      (ii) a set of user performance metrics reflecting the utilization of computing resources by the software application running the user input model; and
   (b) a recommendation engine that correlates the benchmark performance metrics with the user performance metrics to generate a set of recommendations comprising at least one of the plurality of compute infrastructure options.

2. The integrated cloud-based platform of claim 1, wherein the recommendation engine generates the set of recommendations that best satisfies predefined user goals, the user goals including one or more of the following with respect to the user's prospective job: (a) lowest cost; (b) shortest duration; and (c) an optimization function of cost, duration and/or other related factors.

3. The integrated cloud-based platform of claim 1, wherein the recommendation engine filters the plurality of compute infrastructure options based upon predefined user constraints, the user constraints including one or more of the following: (a) inclusion or exclusion of particular cloud service providers, or regions offered by those cloud service providers; (b) availability of specified network connectivity; and (c) real-time availability of particular regions.

4. The integrated cloud-based platform of claim 1, wherein the recommendation engine generates hardware signatures reflecting the utilization of computing resources by the software application when running both the plurality of benchmarks and the user input model.

5. The integrated cloud-based platform of claim 1, wherein the recommendation engine employs one or more machine learning classifiers to classify the behavior of the plurality of benchmarks with respect to utilization of computing resources.

6. The integrated cloud-based platform of claim 5, wherein the machine learning classifiers include a bottleneck classifier that classifies the behavior of the plurality of benchmarks with respect to bottlenecks of specific computing resources encountered by the software application.

7. The integrated cloud-based platform of claim 5, wherein the machine learning classifiers include a scaling classifier that classifies the behavior of the plurality of benchmarks with respect to scalability of particular core types across available core counts.

8. A method of generating compute infrastructure recommendations for a user's prospective job in which a software application runs a user input model, the method comprising the following steps:
   (a) generating a set of benchmark performance metrics reflecting the utilization of computing resources by the software application running each of a plurality of benchmarks across a plurality of compute infrastructure options;
   (b) generating a set of user performance metrics, reflecting the utilization of computing resources by the software application running the user input model; and
   (c) correlating the benchmark performance metrics with the user performance metrics to generate a set of recommendations comprising at least one of the plurality of compute infrastructure options.

9. The method of claim 8, wherein the recommendation engine generates the set of recommendations that best satisfies predefined user goals, the user goals including one or more of the following with respect to the user's prospective job: (a) lowest cost; (b) shortest duration; and (c) an optimization function of cost, duration and/or other related factors.

10. The method of claim 8, wherein the recommendation engine filters the plurality of compute infrastructure options based upon predefined user constraints, the user constraints including one or more of the following: (a) inclusion or exclusion of particular cloud service providers, or regions offered by those cloud service providers; (b) availability of specified network connectivity; and (c) real-time availability of particular regions.

11. The method of claim 8, wherein the recommendation engine generates hardware signatures reflecting the utilization of computing resources by the software application when running both the plurality of benchmarks and the user input model.

12. The method of claim 8, wherein the recommendation engine employs one or more machine learning classifiers to classify the behavior of the plurality of benchmarks with respect to utilization of computing resources.

13. The method of claim 12, wherein the machine learning classifiers include a bottleneck classifier that classifies the behavior of the plurality of benchmarks with respect to bottlenecks of specific computing resources encountered by the software application.

14. The method of claim 12, wherein the machine learning classifiers include a scaling classifier that classifies the behavior of the plurality of benchmarks with respect to scalability of particular core types across available core counts.

* * * * *